(12) United States Patent
Haji et al.

(10) Patent No.: US 9,740,925 B2
(45) Date of Patent: Aug. 22, 2017

(54) METHOD AND SYSTEM FOR THE SPOTTING OF ARBITRARY WORDS IN HANDWRITTEN DOCUMENTS

(71) Applicant: IMDS AMERICA INC., Montreal (CA)

(72) Inventors: Mehdi Haji, Montreal (CA); Dominique Ponson, Montreal (CA)

(73) Assignee: IMDS AMERICA INC., Montreal, Quebec (CA)

( * ) Notice: Subject to any disclaimer, the term of this patent is extended or adjusted under 35 U.S.C. 154(b) by 98 days.

(21) Appl. No.: 14/443,918

(22) PCT Filed: Nov. 19, 2013

(86) PCT No.: PCT/CA2013/000966
§ 371 (c)(1),
(2) Date: May 19, 2015

(87) PCT Pub. No.: WO2014/075174
PCT Pub. Date: May 22, 2014

(65) Prior Publication Data
US 2015/0269431 A1    Sep. 24, 2015

Related U.S. Application Data

(60) Provisional application No. 61/728,048, filed on Nov. 19, 2012.

(51) Int. Cl.
*G06K 9/18* (2006.01)
*G06K 9/00* (2006.01)

(52) U.S. Cl.
CPC ..... *G06K 9/00422* (2013.01); *G06K 9/00154* (2013.01); *G06K 9/00879* (2013.01)

(58) Field of Classification Search
CPC .......... G06K 9/00154; G06K 9/00422; G06K 9/00879
See application file for complete search history.

(56) References Cited

U.S. PATENT DOCUMENTS 7,308,443 B1 * 12/2007 Lee .................. G06F 17/30799
2008/0123940 A1 * 5/2008 Kundu ............... G06K 9/00865
382/159

(Continued)

OTHER PUBLICATIONS

M.-Y. Chen, A. Kundu, and J. Zhou, "Offline handwritten word recognition using a hidden Markov model type stochastic network," IEEE Trans. Patt. Anal. Mach. Intell 16, 5 pages 481-496 (1994).*

(Continued)

*Primary Examiner* — Utpal Shah
*Assistant Examiner* — Ian Lemieux
(74) *Attorney, Agent, or Firm* — Praxis

(57) ABSTRACT

A method and system for the spotting of keywords in a handwritten document, the method comprising the steps of inputting an image of the handwritten document, performing word segmentation on the image to obtain segmented words, performing word matching, and outputting the spotted keywords. The word matching itself consisting in the substeps of performing character segmentation on the segmented words, performing character recognition on the segmented characters, performing distance computations on the recognized characters using a Generalized Hidden Markov Model with ergodic topology to identify words based on character models and performing nonkeyword rejection using a classifier based on a combination of Gaussian Mixture Models, Hidden Markov Models and Support Vector Machines.

21 Claims, 20 Drawing Sheets

(56) References Cited

U.S. PATENT DOCUMENTS

| | | | | |
|---|---|---|---|---|
| 2009/0003705 A1* | 1/2009 | Zou | ................... | G06K 9/00416 382/187 |
| 2009/0060335 A1* | 3/2009 | Rodriguez Serrano | .............. | G06K 9/00194 382/177 |
| 2010/0067793 A1* | 3/2010 | Serrano | ................ | G06K 9/6297 382/179 |
| 2012/0057775 A1* | 3/2012 | Suzuki | .................... | H04N 5/76 382/154 |

OTHER PUBLICATIONS

C. Bahlmann and H. Burkhardt. Measuring HMMsimilarity with the Bayes probability of error and its application to online handwriting recognition. In Proc. of the 6th ICDAR pp. 406-411 (2001).*

* cited by examiner

MERGECONNECTEDCOMPONENTS($S$, $N_{min}$, $N_{max}$)

*Input.* A sequence of connected components $S$ corresponding to characters or sub-characters.

*Output.* A set of output sequence of connected components $W$ with sizes of $\geq N_{min}$ and $\leq N_{max}$.

$Q \leftarrow \emptyset$

*Define of neighborhood relation $R$.*

$G_0(V_0, E_0) \leftarrow$ the neighborhood graph corresponding to $S$.

where $|V_0| = |S|$ and $|E_0|$ = number of pairs of connected components of $S$ which are neighbors according to $R$.

$Q \leftarrow$ PARTITIONGRAPH( $\{G_0\}$, $Q$, $N_{min}$, $N_{max}$ ).

$W \leftarrow$ Set of sequence of connected components corresponding to $Q$.

return $W$.

PARTITIONGRAPH( $P$, $Q$, $N_{min}$, $N_{max}$ )

*Input.* A set of partitioned graphs $P$ where the partitions of each graph determine the connected components of $S$ that are merged together.

*Output.* A set of partitioned graphs $Q$ with sizes of $\geq N_{min}$ and $\leq N_{max}$.

Initialize an empty list of $N$-best partitioned graphs $T_N$ (for the next level of search).

for each partitioned graph $G(V,E) \in P$ do if $|V| < N_{min}$ then continue.

else if $N_{min} \leq |V| \leq N_{max}$ then $Q \leftarrow Q \cup \{G\}$.

if $N_{min} == |V|$ then continue. (* no more merging is needed *)

for each edge $e \in E$ do merge the two end partitions (i.e. two end sets of vertices) of $e$ to make a new partitioned graph $G_{new}$.

Insert $G_{new}$ to $T_N$.

Compute the score of each partitioned graph $T_N$ using Equation 23 and keep the $N$-best ones.

PARTITIONGRAPH( $T_N$, $Q$, $N_{min}$, $N_{max}$ )

return $Q$.

FIG.6

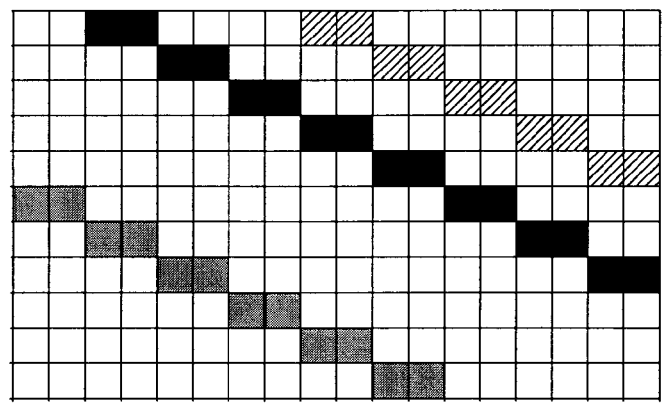
FIG.9
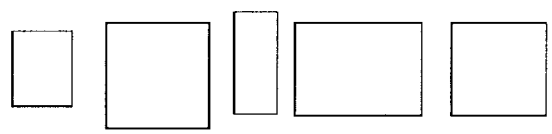
FIG.10A (Hypothesis 1)
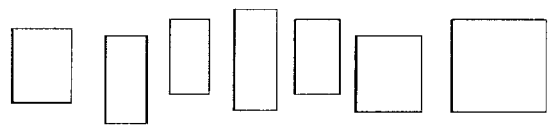
FIG.10B (Hypothesis 2)
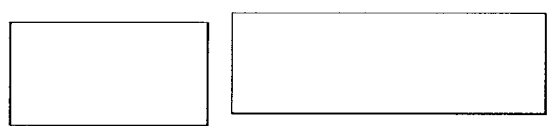
FIG.10C (Hypothesis 3)
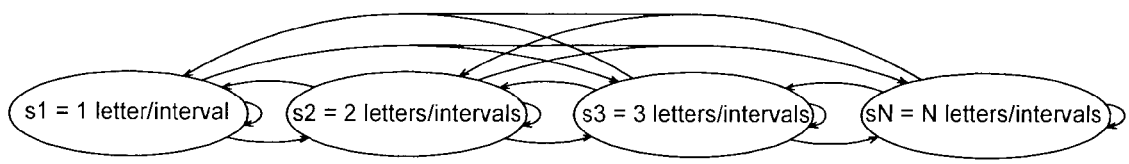
FIG.11

(input image)

(after slant correction and thresholding)

(after vertically filling of all CCs)

(skeleton of background)

(after removing short E2J curves)

(After connecting BBEPDs and ABEPUs to skeleton)

(handwritten word)

(corresponding neighborhood graph)

(standard classification)

(perturbation-based classification)

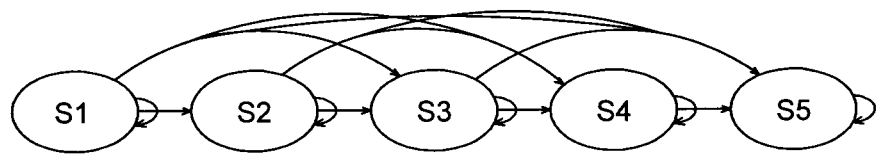
FIG.17A  (5-state Left-to-Right HMM)
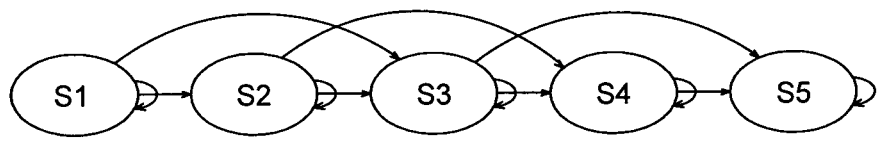
FIG.17B
(5-state Left-to-Right HMM with a maximum relative forward jump of 2)
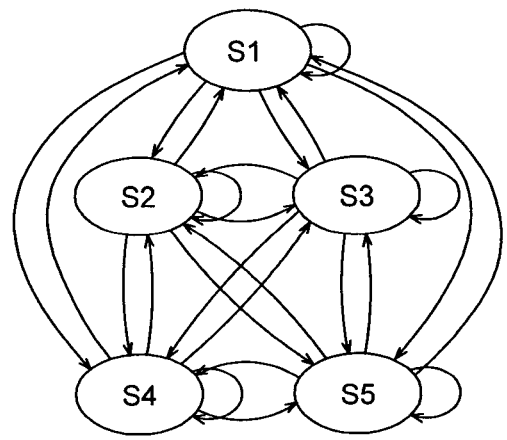
FIG.17C
(5-state fully connected HMM)

e|R: insert region

C|e: insert character

C|R: substitute a character by a region

C|RR: substitute a character by two neighboring regions

C|RRR: substitute a character by three neighboring regions

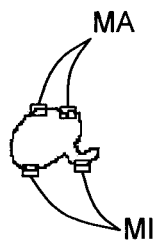
FIG.23A 'a'
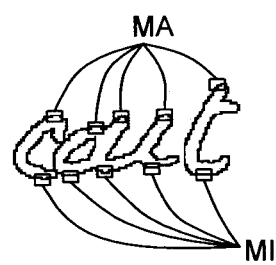
FIG.23B 'cart'
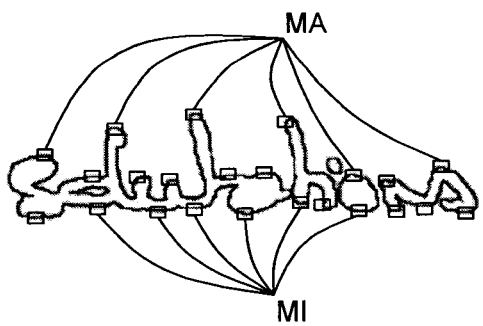
FIG.23C 'salutations'

METHOD AND SYSTEM FOR THE SPOTTING OF ARBITRARY WORDS IN HANDWRITTEN DOCUMENTS

CROSS-REFERENCE TO RELATED APPLICATIONS

This application claims the benefits of U.S. provisional patent application No. 61/728,048 filed on Nov. 19, 2012, which is herein incorporated by reference.

TECHNICAL FIELD

The present disclosure relates to a method and system for the spotting of arbitrary words in handwritten documents.

BACKGROUND

Despite the existence of electronic media in today's world, a considerable amount of written communications is in paper form such as books, bank checks, contracts, etc. There is an increasing demand for the automation of information extraction, classification, search, and retrieval of documents.

Recognition of printed characters using computers has been one of the first and most successful applications of pattern recognition. Optical Character Recognition (OCR) has been an active field of research for more than three decades. There are hundreds of hundreds of approaches proposed to address the recognition of machine-printed and handwritten characters for different scripts. For machine-printed Latin scripts, the problem can be considered as already solved at least when the level of noise is low. On applications where clear imaging is available typical recognition rates for machine-printed characters exceed 99%. However, the difficulty is in dealing with handwritten characters and words, particularly when the images are noisy. The difficulty of the recognition of handwriting lies in the fact that there can be as many handwriting styles as there are people. In fact, it is widely believed that each individual's handwriting is unique to themselves. In the discipline of forensic science, handwriting identification, which is the study of the identification or verification of the writer of a given handwritten document, is based on the principle that the handwritings of no two people are exactly alike. This means that the number of forms that a handwritten character/word can take is too many, making the recognition a difficult task even for humans.

Accordingly, there is a need for a complete methodology for the spotting of arbitrary keywords in handwritten document images that can handle the challenges that exist in real-world situations.

SUMMARY

The present disclosure provides a method for the spotting of keywords in a handwritten document, comprising the steps of:
  inputting an image of the handwritten document;
  performing word segmentation on the image to obtain segmented words;
  performing word matching, consisting in the sub-steps of:
    performing character segmentation on the segmented words;
    performing character recognition on the segmented characters;
    performing distance computations on the recognized characters using a Generalized Hidden Markov Model with ergodic topology to identify words based on character models;
    performing non-keyword rejection using a classifier based on a combination of Gaussian Mixture Models, Hidden Markov Models and Support Vector Machines;
  outputting the spotted keywords.

The present disclosure further provides a method as above, further comprising the steps of:
  generating, prior to the step of performing word matching, word segmentation hypotheses for each of the extracted text lines using a Markov Chain or a Hidden Markov Model;
  performing a threshold selection on the word segmentation hypotheses using a segmentation threshold;
  selecting the most likely word segmentation hypotheses based on the segmentation threshold.

The present disclosure further still provides a method as above, wherein the sub-step of performing character segmentation on the segmented words includes the sub-steps of:
  performing pre-processing on the segmented characters;
  computing a background skeleton;
  computing the skeletal graph from the background skeleton;
  removing curves and short branches from the skeletal graph;
  connecting each branch corresponding to an end-point of a downward branch that goes below a baseline of the image to a nearest point in the skeletal graph that is below the baseline of the image;
  connecting each branch corresponding to an end-point of an upward branch that goes above the baseline of the image to a nearest point in the skeletal graph that is above the baseline of the image;
  removing all remaining branches of the skeletal graph;
  providing the segmented characters.

The present disclosure also provides a method as above, wherein the sub-step of performing character segmentation on the segmented words further includes the sub-step of:
  detecting, prior to performing pre-processing on the segmented characters, under-segmented pairs of characters using a classifier based on a fuzzy interference system using average number of transition features.

Furthermore, the present disclosure provides a system for the spotting of words in a handwritten document, comprising:
  an input/output interface configured to receive an image of the handwritten document;
  a processor in communication with the input/output interface, the processor configured for:
    performing word segmentation on the image to obtain segmented words;
    performing word matching, consisting in:
      performing character segmentation on the segmented words;
      performing character recognition on the segmented characters;
      performing distance computations on the recognized characters using a Generalized Hidden Markov Model with ergodic topology to identify words based on character models;
      performing non-keyword rejection using a classifier based on a combination of Gaussian Mixture Models, Hidden Markov Models and Support Vector Machines;

outputting the spotted keywords.

The present disclosure further provides a system as above, wherein the processor is further configured to perform:
- generating, prior to performing word matching, word segmentation hypotheses for each of the extracted text lines using a Markov Chain or a Hidden Markov Model;
- performing a threshold selection on the word segmentation hypotheses using a segmentation threshold;
- selecting the most likely word segmentation hypotheses based on the segmentation threshold.

The present disclosure further still provides a system as above, wherein, when performing character segmentation on the segmented words, the processor is further configured for:
- performing pre-processing on the segmented characters;
- computing a background skeleton;
- computing the skeletal graph from the background skeleton;
- removing curves and short branches from the skeletal graph;
- connecting each branch corresponding to an end-point of a downward branch that goes below a baseline of the image to a nearest point in the skeletal graph that is below the baseline of the image;
- connecting each branch corresponding to an end-point of an upward branch that goes above the baseline of the image to a nearest point in the skeletal graph that is above the baseline of the image;
- removing all remaining branches of the skeletal graph;
- providing the segmented characters.

The present disclosure also provides a system as above, wherein, when performing character segmentation on the segmented words, the processor is further configured for:
- detecting, prior to performing pre-processing on the segmented characters, under-segmented pairs of characters using a classifier based on a fuzzy interference system using average number of transition features.

BRIEF DESCRIPTION OF THE FIGURES

Embodiments of the disclosure will be described by way of example only with reference to the accompanying drawings, in which:

FIG. 6 is an example of a merging algorithm for sequence of connected components based on graph partitioning in accordance with an illustrative embodiment of the present disclosure;

FIG. 9 is a graphical representation of an example of diagonals of an image linear interpolation corresponding to $\phi=30°$ and $D_f=2$;

FIGS. 10A, 10B and 10C are schematic representations of an example of three different word segmentation hypotheses for a text line represented as lists of bounding boxes;

FIG. 11 a directed weighted graph representation of an example of a Markov chain model for distribution of words;

FIGS. 14A and 14B are schematic representations of an example of a neighborhood graph (FIG. 14B) corresponding to a handwritten word (FIG. 14A);

FIGS. 17A, 17B and 17C are schematic representations of examples of HMMs with (FIGS. 17A and 17B) and without (FIG. 17C) topological constraints;

FIGS. 23A, 23B and 23C are examples of local minima/maxima contour points of handwritten words.

DETAILED DESCRIPTION

Generally stated, the non-limitative illustrative embodiment of the present disclosure provides a method and system for the spotting of words in handwritten documents. The method and system provide for automatic retrieval/classification of collections of images of unconstrained documents based on the presence of one or several keywords which can be specified by the user. Keyword spotting is the core problem in search/retrieval/classification applications. The method is composed of two major steps: segmentation and word matching. In the former, a word hypothesis is generated and in the latter, a decision is taken as to whether the generated word hypothesis is a specific keyword or not. The decision step is carried out through a two-level classification where first, an input image is assigned to a keyword or non-keyword class and then transcribes the image if it is passed as a keyword. This two-level approach not only addresses the search problem in handwritten documents but also the classification and retrieval without the need for the transcription of the whole document image.

In general, an unconstrained handwritten document can have the following characteristics:

a) the text is often densely written and the text items are not well-separated, adjacent lines may be connected and the distance between neighboring words may be less than the gap between characters of the same word;

b) aside from text, usually there are other types of items present in the document such as underlines, signatures, barcodes, graphics, logos etc.;

c) the document may contain a combination of handwritten and machine-printed materials which need different types of processing;

d) the text lines may not be always straight and they do not always have a single global skew angle;

e) different text areas may have different font sizes;

f) the text items may be connected to each other or to non-text items by noise, scratches, tables, rule/margin lines or background textures;

g) the document may have non-uniform illumination. This is especially true for aged and historical documents;

h) characters may be broken due to noise, poor contrast, non-uniform ink, and/or scanning artifacts; and i) words may be slanted especially in handwriting (i.e. vertical strokes of the text may deviate from the vertical direction), and the slant is not uniform across the text and/or for the same word.

Figure 1:
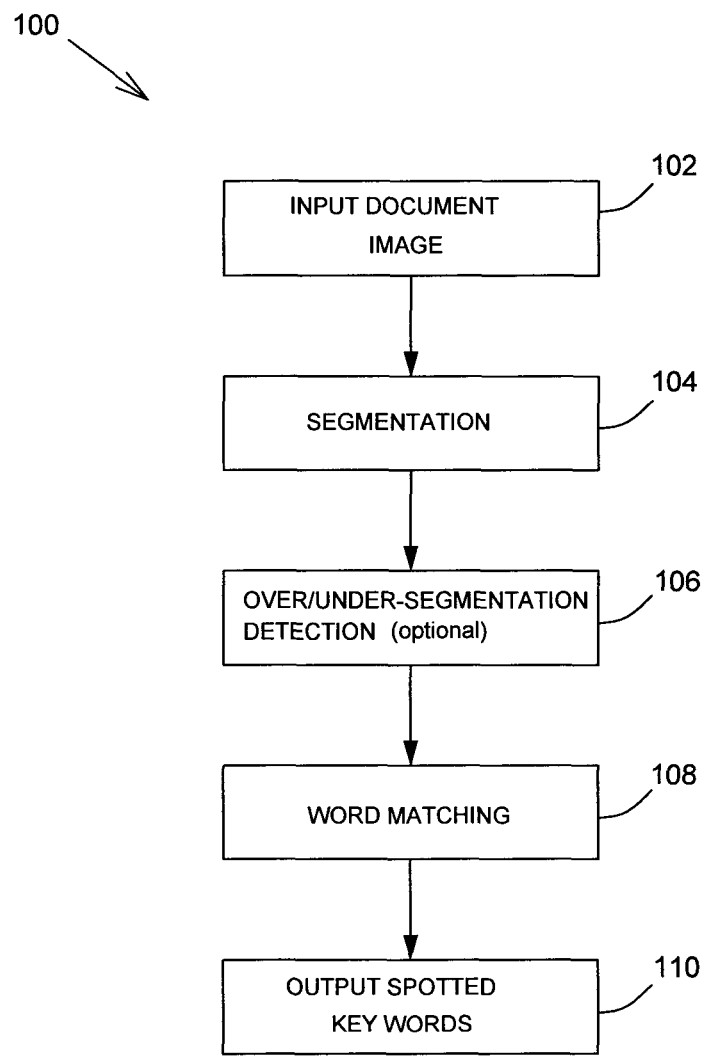
FIG. 1 is a flow diagram of the spotting of words in handwritten documents procedure in accordance with an illustrative embodiment of the present disclosure.

Referring to FIG. 1, there is shown a flow diagram of an illustrative example of the spotting of words in handwritten documents procedure 100 in accordance with an illustrative embodiment of the present disclosure. The steps of the procedure 100 are indicated by blocks 102 to 110.

The procedure 100 starts at block 102 where the image of the handwritten document is inputted, e.g. using an imagining system such as a scanner.

At block 104, segmentation of the document image is performed. Segmentation is concerned with dividing the document image into its constituent parts. In general, a document may be composed of various types of items other than text such as margins, graphics, logos, barcodes, signatures, tables etc. Therefore the document segmentation step is composed of a series of pre-processing (for removing any items but text), line extraction and word segmentation sub-steps (lines and words are the building blocks of any text, therefore the document is divided into its constituent lines and each line into its constituent words), which will be detailed further on.

Then, optionally at block 106, a statistical hypothesis testing procedure for handwritten word segmentation may be applied. This procedure can be used along with any word segmentation algorithm performed at block 104 in order to detect over-segmentation or under-segmentation errors or to adapt the word segmentation algorithm to new data in an unsupervised manner. The approach of the procedure is to learn the geometrical distribution of words within a sentence using a Markov chain or a Hidden Markov Model (HMM). In the former, it is assumed that all the necessary information is observable, where in the latter, it is assumed that the minimum observable variables are the bounding boxes of the words, and the hidden variables are the part of speech information. During the testing, the likelihood of the output of the word segmentation algorithm is computed against the trained model using the Viterbi algorithm, and the word segmentation hypothesis is accepted or rejected based on the computed likelihood. The hypothesis testing procedure will be further detailed below.

At block 108, after generating a set of word candidates, each word is compared with the set of template keywords and if there is a match and the location of the word in the document image is spotted.

Finally, at block 110, the spotted keywords are outputted, i.e. provided, and the whole document image may be assigned to a certain category based on the presence of all or part of the detected keywords.

Segmentation

Figure 2:
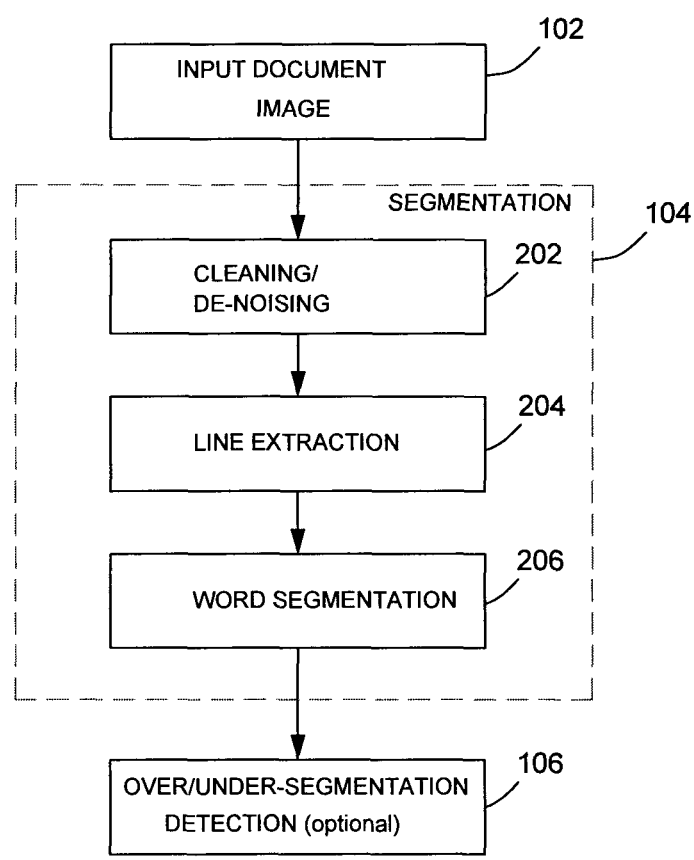
FIG. 2 is a flow diagram of the segmentation step in accordance with an illustrative embodiment of the present disclosure.

Referring now to FIG. 2, there is shown a flow diagram of the segmentation step performed at block 104 of procedure 100 (see FIG. 1). The sub-steps of step 104 are indicated by blocks 202 to 206.

Step 104 starts at block 202 where pre-processing of the document image is performed. For example, margin removal, skew correction, rule-line removal, noise removal (i.e. binarization/enhancement). Such techniques are well known in the art.

Then, at block 204, line extraction is performed in order to identify the text lines from the text and finally, at block 206, word segmentation is performed to identify the words within the text lines. Examples of the line extraction and word segmentation procedures will be further detailed below.

Line Extraction

A new line extraction method was developed based on Fast Fourier-based Steerable (FFS) filtering. The algorithm is composed of two stages: fast filtering and local skew correction. It is to be understood that in alternative embodiments other line extraction methods may be used.

Fast Fourier-based Steerable Filtering

For the extraction of the text lines based on filtering, the obvious choice for the kernel is the rectangular (or box) kernel which will result in the so-called Adaptive Local Connectivity Map (ALCM). However, the computation of the map based on filtering in spatial domain is a time consuming process. Therefore, we replace the box kernel with a Gaussian kernel and compute the map using FFS filtering which is based on the decomposition of the filter and Fast Fourier Transform (FFT) operations, resulting in significant speedup over the conventional convolution in spatial domain.

Gaussian kernels are among the most commonly used kernels in image processing due to their desirable properties from both theoretical and computational point of view. The general case of an anisotropic Gaussian filter in two dimensions is defined by:

$$G(x, y; \sigma_x, \sigma_y) = \frac{1}{2\pi \cdot \sigma_x \cdot \sigma_y} e^{-\left(\frac{x^2}{2\sigma_x^2} + \frac{y^2}{2\sigma_y^2}\right)} \qquad \text{Equation 1}$$

Where $\sigma_x$ is the standard deviation along the x-axis, and $\sigma_y$ is the standard deviation along the y-axis. This filter is axis-aligned, and thus can be used to analyze fairly horizontal or vertical structures. In order to analyze structures with arbitrary orientations, we have to "steer" (orient) the filter at arbitrary orientations. The existence of basis filters is important from a computing perspective. It is well known that direct implementation of filtering by convolution in spatial domain is slow, particularly in higher dimensions. By decomposing a 2D filter as a liner combination of a set of 1D filters, the result of the filtering can be computed with much less calculation time.

The general case of an oriented anisotropic Gaussian filter in two dimensions is obtained by rotating the basic filter defined in Equation 1 by the desired angle θ. Let's denote the oriented anisotropic Gaussian filter by $G_\theta(u, v, \sigma_u, \sigma_v, \theta)$. We can define $G_\theta$ as follows:

$$G_\theta(u, v; \sigma_u, \sigma_v, \theta) = \frac{1}{\sqrt{2\pi} \cdot \sigma_u} e^{-\frac{1}{2} \frac{u^2}{\sigma_u^2}} * \frac{1}{\sqrt{2\pi} \cdot \sigma_v} e^{-\frac{1}{2} \frac{v^2}{\sigma_v^2}} \quad \text{Equation 2}$$

Where "*" denotes convolution, and the relation between the two coordinate systems x-y and u-v is given as follows:

$$\begin{pmatrix} u \\ v \end{pmatrix} = \begin{bmatrix} \cos\theta & \sin\theta \\ -\sin\theta & \cos\theta \end{bmatrix} \begin{pmatrix} x \\ y \end{pmatrix} \quad \text{Equation 3}$$

As can be seen, the filter is separated in u and v directions. However, this separation does not form a convenient basis from a computational perspective. The filter needs to be decomposed along the horizontal or vertical direction. One solution is to decompose the filter along the x-direction and another direction as follows:

$$G_\theta(x, y; \sigma_x, \sigma_\varphi, \theta) = \frac{1}{\sqrt{2\pi} \cdot \sigma_x} e^{-\frac{1}{2} \frac{x^2}{\sigma_x^2}} * \frac{1}{\sqrt{2\pi} \cdot \sigma_\varphi} e^{-\frac{1}{2} \frac{t^2}{\sigma_\varphi^2}} \quad \text{Equation 4}$$

This equation represents a Gaussian filtering along the x-direction, followed by a Gaussian filtering along a line $t = x \cos\phi + y \sin\phi$. It can be shown that the standard deviations $\sigma_x$ and $\sigma_\phi$, and the intercept of the line $\tan\phi$ are computed as follows:

$$\sigma_x = \frac{\sigma_u \cdot \sigma_v}{\sqrt{\sigma_u^2 \sin^2\theta + \sigma_v^2 \cos^2\theta}} \quad \text{Equation 5}$$

$$\sigma_\varphi = \frac{1}{\sin\varphi} \sqrt{\sigma_u^2 \sin^2\theta + \sigma_v^2 \cos^2\theta} \quad \text{Equation 6}$$

$$\tan\varphi = \frac{\sigma_u^2 \sin^2\theta + \sigma_v^2 \cos^2\theta}{(\sigma_u^2 - \sigma_v^2)\cos\theta\sin\theta} \quad \text{Equation 7}$$

The computation of the FFT in the x-direction is straightforward. However, for the computation of the FFT in the φ-direction, interpolation is required because a point on the line may not necessarily lie on an image pixel. Nearest-neighbor interpolation will be used as it facilitates the computation of the FFT.

Computation of FFT in φ-direction Using Linear Interpolation

In spatial domain, filtering along the line t with intercept $\mu = \tan\phi$ is achieved by:

$$g_\theta[x, y] = \quad \text{Equation 8}$$
$$w_0 g_x[x, y] + \sum_{j=1}^{\lfloor M/2 \rfloor} w_j(g_x[x - j/\mu, y - j] + g_x[x + j/\mu, y + j])$$

Where $g_x[x,y]$ is the input image filtered with the x-filter, and $w_j$ is the filter kernel for half the sampled Gaussian from 0 to $\lfloor M/2 \rfloor$.

The coordinates y±j exactly lie on an image pixel, however the coordinates x±j/μ coordinate may fall between two image pixels. In order to solve this problem, the value of the pixel of interest is computed by the linear interpolation of the two neighboring pixels. Therefore, Equation 8 becomes:

$$g_\theta[x, y] = w_0 g_x[x, y] + \sum_{j=1}^{\lfloor M/2 \rfloor} w_j \{a \cdot g_x[\lfloor x - j/\mu \rfloor, y - j] + \quad \text{Equation 9}$$
$$a \cdot g_x[\lfloor x + j/\mu \rfloor, y + j] + (1 - a) \cdot g_x[\lceil x - j/\mu \rceil,$$
$$y - j] + (1 - a) \cdot g_x[\lceil x + j/\mu \rceil, y - j]\}$$
$$= w_0 g_x[x, y] + a \cdot \sum_{j=1}^{\lfloor M/2 \rfloor} w_j \{g_x[\lfloor x - j/\mu \rfloor, y - j] +$$
$$g_x[\lfloor x + j/\mu \rfloor, y + j]\} + (1 - a) \cdot \sum_{j=1}^{\lfloor M/2 \rfloor} w_j$$
$$\{g_x[\lceil x - j/\mu \rceil, y - j] + g_x[\lceil x + j/\mu \rceil, y + j]\}.$$

Where a is the interpolation factor.

According to Equation 9, filtering in the φ-direction can be achieved by two FFT operations, where each one is computed for a sequence of gray values at integer coordinates. However, this formulation requires the computation of the coordinates of the integer pixels for each pixel of the image separately. In other words, it is desirable to compute the FFT along every diagonal (in the φ-direction) of the image only once and then use the FFT coefficients for the computation of the filtering (in the φ-direction). This can be achieved by using nearest-neighbor interpolation rather than linear interpolation.

Computation of FFT in φ-direction Using Nearest-Neighbor Interpolation

Figure 7:
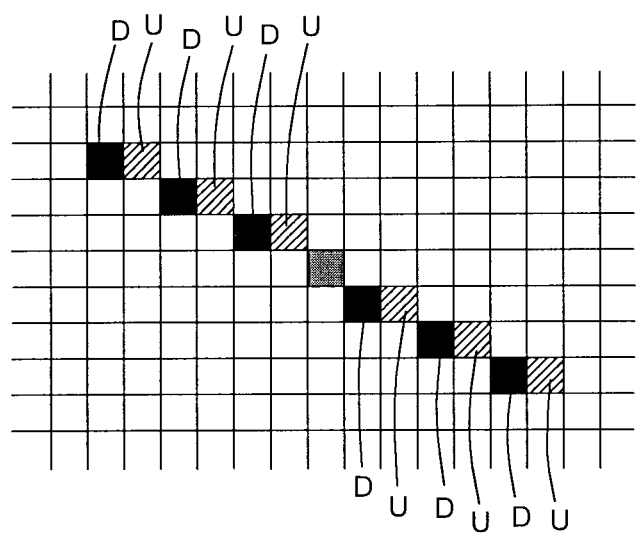
FIG. 7 is a graphical representation of an example of a linear interpolation for the computation of the FFT in a $\phi=30°$ direction.

In FIG. 7, it can be seen that an approximation to the line the φ-direction can be achieved by starting from the leftmost pixel of the line and skipping every other pixel until the other end of the line. In this example, the size of the filter is 7, and the orientation is 30°. Pixels identified with a D correspond to the coordinates that are rounded down to the closest column index, and pixels identified with a U correspond to the coordinates that are rounded up to the closest column index. Therefore, using nearest-neighbor interpolation rather than linear interpolation, Equation 9 reduces to:

$$g_\theta[x, y] = w_0 g_x[x, y] + \quad \text{Equation 10}$$
$$\sum_{j=1}^{\lfloor M/2 \rfloor} w_j \{g_x[\lfloor x - j/\mu \rfloor, y - j] + g_x[\lceil x + j/\mu \rceil, y + j]\}$$

The advantage of Equation 10 lies in the fact that the pixels approximating the line are symmetric around the central pixel. Therefore, the filtering along the line in the φ-direction can be computed by down-sampling followed by the FFT along the corresponding diagonal of the image. In the example shown in FIG. 7, every other pixel was picked out, therefore the down-sampling factor is 2. In general, the down-sampling factor $D_f$ is defined by the following equation:

$$D_f = \begin{cases} \text{round}(1/\mu) & \text{if } \mu < 1, \text{ or } \varphi < 45° \\ \text{round}(\mu) & \text{if } \mu \geq 1, \text{ or } \varphi \geq 45° \end{cases} \quad \text{Equation 11}$$

Figure 8A:
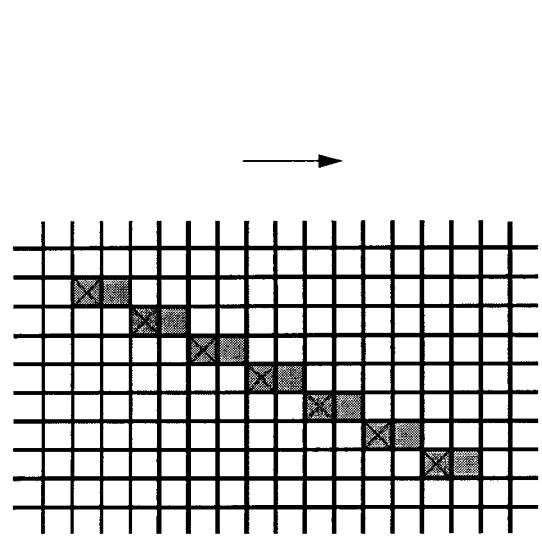
FIGS. 8A and 8B are graphical representations of examples of down-sampling corresponding to nearest-neighbor interpolation when $\phi<45°$ (FIG. 8A), and when $\phi \geq 45°$ (FIG. 8B)
Figure 8B:
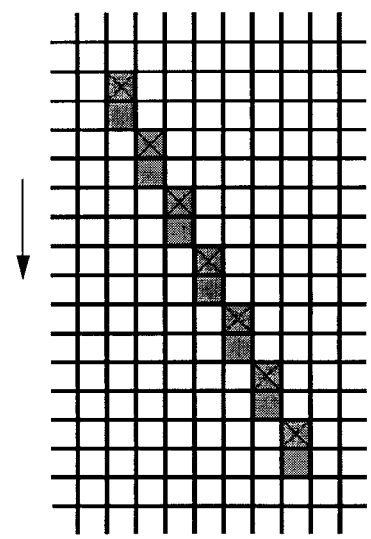

This equation simply states that if the line is more horizontal than vertical (i.e. $\phi<45°$) we down-sample along the horizontal direction, and similarly, if the line is more vertical than horizontal (i.e. $\phi\geq45°$) we down-sample along the vertical direction (see FIGS. 8A and 8B, respectively).

Another advantage of using nearest-neighbor interpolation is now clear. The filtering operation can be performed with an integer down-sampling factor, which further reduces the complexity of the computations. In general, if the down-sampling factor is not an integer but rather a rational fraction, the down-sampling operation can be implemented by two sampling operations: an integer up-sampling followed by an integer down-sampling.

Having described the down-sampling operation, the procedure to perform the convolution in $\phi$-direction using the FFT is as follows. First, the $\mu$-diagonals of the image is defined. A $\phi$-diagonal of an image is a diagonal corresponding to the filter angle $\phi$ and the down-sampling factor $D_f$. For $\phi<45°$, we obtain a $\phi$-diagonal by starting from a pixel on the left-most column or the top-most row and then going $D_f$ pixels to the right and one pixel to the bottom until the right-most column or the bottom-most row of the image is reached (see FIG. 9). Similarly, for $\phi\geq45°$, we obtain a $\phi$-diagonal by starting from a pixel on the left-most column or the top-most row and then going $D_f$ pixels to the bottom and 1 pixel to the right until we reach the right-most column or the bottom-most row of the image.

Let $x(n)$ be a discrete signal of length N in time domain, let $C(\omega)$ be the Discrete Time Fourier Transform (DTFT) of $x(n)$. Let $x(Mn)$ be the down-sampled version of $x(n)$ corresponding to a down-sampling factor of M. Then the DTFT of $x(Mn)$ denoted by $C_d(\omega)$ have the following relation with $C(\omega)$:

$$C_d(k) = \frac{1}{M}\sum_{l=0}^{M-1} C(k+Ll) \quad \text{Equation 12}$$

Where L=N/M, and k=0, 1, . . . L-1.

Computing Line Maps by Fast Oriented Anisotropic Gaussian Filtering

Figure 4:
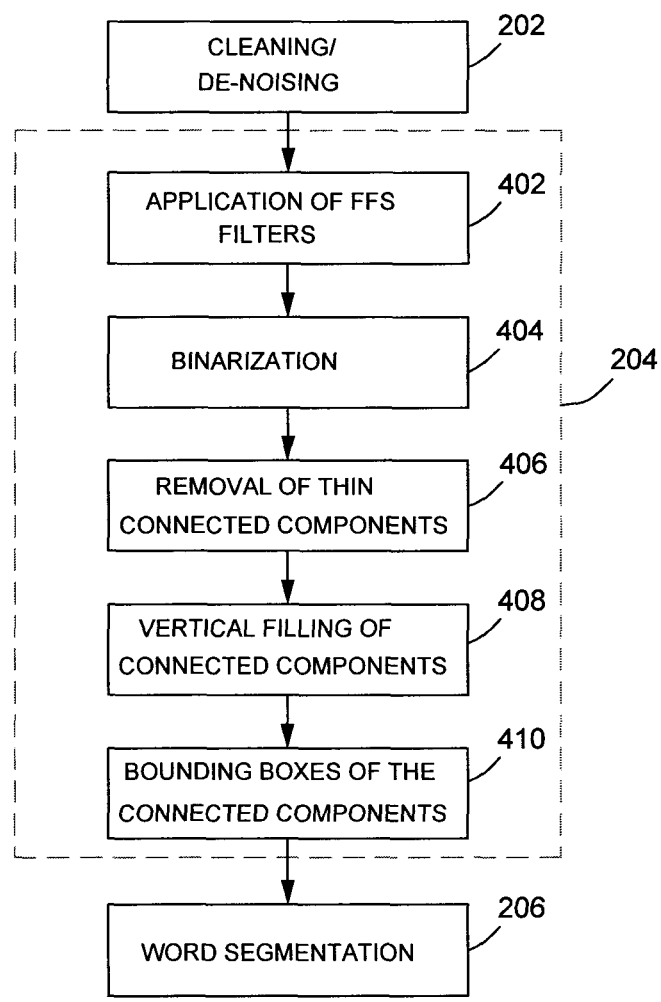
FIG. 4 is a flow diagram of the line extraction sub-step in accordance with an illustrative embodiment of the present disclosure.

Referring to FIG. 4, having defined the FFS filtering, there is shown a flow diagram of an illustrative example of the line extraction (or line map) sub-step performed at block 204 of FIG. 2. The sub-steps of sub-step 204 are indicated by blocks 402 to 410.

Sub-step 104 starts at block 202 where, after pre-processing of the document image is performed at block 202 of FIG. 2 (comprising, for example, pre-removing the margins from the page and correcting the global skew), a set of FFS filters is applied to the image and the outputs are added together. A set of filters is used rather than only one horizontal filter because the text lines in handwritten documents may have multiple skew angles. Therefore, the filters are steered at all possible orientations that the text lines may take.

At block 404, the resultant filtered image from block 402 is binarized in order to obtain the binarized line map.

The binarized line map is post-processed by removing, at block 406, thin connected components in the binarized line map that correspond to background noise, and filling, at block 408, the remaining connected components vertically. The vertical filling operation is defined as finding the upper and lower profile of a connected component and then filling all the background pixels within any point on the upper profile and its corresponding point on the lower profile.

Finally, at block 410, the locations of the text lines are obtained.

In order to facilitate the processing for subsequent steps, a local skew correction may be performed inside the bounding box corresponding to each text line. The local skew is corrected by the robust line fitting technique. In robust line fitting, the probability of the data given the model is maximized rather than minimizing the squared sum of errors that is done in least-square fitting. For straight line fitting, the probability of the data given the model is defined as follows:

$$\propto \prod_{i=0}^{N-1}\left\{\exp\left[-\frac{1}{2}\left(\frac{y_i - y(x_i)}{\sigma}\right)^2\right]\Delta y\right\} \quad \text{Equation 13}$$

When the data points are noisy, the robust line fitting gives a better fit than the least square because it is tailored to be less sensitive to outliers.

Word Segmentation

Once the text lines are extracted, we have to segment words on the same text line. Word segmentation in handwritten document is a difficult task because inter-word-spacing is sometimes wider than the intra-word-spacing. Thus, it is not always possible to segment the document at the word level perfectly using geometrical information only.

Many different approaches to segmenting words have been proposed. Word segmentation algorithms can be categorized as being top-down, bottom-up or hybrid. One algorithm that may be used is the scale-space algorithm. The word segmentation task is carried out by an enhanced version of the scale-space algorithm using derivatives of fast anisotropic Gaussian filters implemented in the Fourier domain. Therefore, the approach to word segmentation is based on the same theory that was introduced earlier with regard to the extraction of text lines with two minor differences. First, there is no need to steer the Gaussians at different orientations because words within a skew corrected line are reasonably straight, and moreover the aspect ratio of a word (ratio between its width to its height) is much less than that of a text line. Second, two Gaussian filtering operations are used in order to compute the Laplacian of Gaussian (LoG) operator.

The scale-space is computed by convolving the image with a kernel that is the sum of unmixed second partial derivates of a Gaussian (in the x and y directions):

$$L(x, y; \sigma_x, \sigma_y) = G_{xx}(x, y; \sigma_x, \sigma_y) + G_{yy}(x, y; \sigma_x, \sigma_y) \quad \text{Equation 14}$$

This operator is called Laplacian of Gaussian (LoG) filtering. It can be shown that the LoG operator can be approximated by the difference of two standard Gaussian filtering:

$$L(x, y; \sigma_x, \sigma_y) \approx -\frac{1}{\pi\sigma_x^2\sigma_y^2}\left[1-\left(\frac{x^2}{2\sigma_x^2}+\frac{y^2}{2\sigma_y^2}\right)\right]e^{-\left(\frac{x^2}{2\sigma_x^2}+\frac{y^2}{2\sigma_y^2}\right)} \approx$$

$$\frac{1}{\pi\sigma_x\sigma_y}e^{-\left(\frac{x^2}{2\sigma_x^2}+\frac{y^2}{2\sigma_y^2}\right)} - \frac{1}{\pi K^2\sigma_x\sigma_y}e^{-\left(\frac{x^2}{2K^2\sigma_x^2}+\frac{y^2}{2K^2\sigma_y^2}\right)}$$

Equation 15

This equation actually subtracts a wide Gaussian from a narrow Gaussian in order to approximate the second partial derivative.

Over/Under-Segmentation Detection

With respect to step 106 of procedure 100 (see FIG. 1), The segmentation of words in unconstrained handwritten documents is a challenging task mainly because the boundaries between words are not well-defined without knowing their meanings. As mentioned previously, inter-word-spacing is sometimes wider than the intra-word-spacing and thus it is not always possible to perfectly segment the document at the word level using geometrical information only. Considering the fact that both the segmentation and the recognition information are unknown for a given document image, there are two major approaches to address the word segmentation problem: implicit and explicit. In the former, the segmentation and recognition are done simultaneously; in other words, the word boundaries are found as a by-product of a sentence recognition algorithm. In the latter, the segmentation is done as an independent step before recognition. Explicit word segmentation algorithms can be broadly categorized into either top-down or bottom-up approaches. The basic idea behind top-down approaches is to split the input text line into words hypotheses based on the pair-wise distances (and other geometrical properties) between neighboring connected components. While the basic idea behind bottom-up approaches is to merge neighboring connected components that satisfy certain geometrical constrains in order to form the words hypotheses.

No matter what type of word segmentation algorithm is used, the output of the algorithm can be thought of as a list of rectangles corresponding to the bounding boxes of the words in the input text line. The main motivation behind this procedure is to find a statistical testing method in order to detect unlikely segmentation hypotheses based on the information of the bounding boxes only. Referring to FIGS. 10A, 10B and 10C, there is shown three word segmentation hypotheses for an input text line. Given that the rectangles correspond to words, it can be observed that Hypothesis #1 (FIG. 10A) is more likely to be the correct segmentation compared to Hypotheses #2 (FIG. 10B) and #3 (FIG. 10C). Hypothesis #2 is most likely over-segmented because it is rare that a long sentence is composed of many consecutive short words. Hypothesis #3 is most likely under-segmented because it is rare that a long sentence is composed of only two long words. The idea is to learn a statistical model from a set of correctly segmented lines so that it assigns higher probabilities to more likely hypotheses, and lower probabilities to highly over-segmented and highly under-segmented hypotheses. Besides detecting the over-segmented and under-segmented errors, the model can also be used to automatically adjust the free parameters of any word segmentation algorithm in order to obtain the most likely segmentation output.

Modeling of Words Distribution

The word segmentation process can be considered as a discrete-time stochastic phenomenon that satisfies the Markov property. The Markov property obviously holds because the unidirectional property of text lines implies that the conditional probability distribution of future words only depends on the current word, and not the preceding or future words. Therefore, depending on whether it is assumed that all variables in the problem are observable or not, there are two general strategies for the modeling of the distribution of words in a sentence: observed-variable approach and latent-variable approach. In the former, the words distribution is modeled based on a Markov chain; while in the latter, the words distribution is modeled using a Hidden Markov Model (HMM).

In the problem of estimating the likelihood of the segmentation hypothesis based on the bounding boxes of the words, in general, there are a number of hidden variables involved. The HMM framework somehow allows the inference of these hidden variables from the observable variables. The meanings or shapes of the words, the context of the writing, the author's writing style, number of letters in the words, part of speech information etc., may be considered as hidden variables. Out of these hidden variables, it is quite meaningful to associate the number of letters in the words and the part of speech information with the observable variables (i.e. the bounding boxes in the simplest case). Part of speech information that is of particular interest is mainly prepositions (on, in, to, by, for, with, at, of, from, as, . . . ) and pronouns (I, me, we, us, you, him, it, . . . ) that are typically short length words. Therefore, by inferring the part of speech information from the observable variables, the distribution model may be enhanced so that it can, to some extent, distinguish sequences of short length prepositions or pronouns from sequences of over-segmented words.

In the following, first the Markov chain and then the hidden Markov model for the distribution of words will be presented.

Markov Chain

A Markov chain is the simplest Markov model where the system states are fully observable. A Markov chain is represented by a pair $\mu=(S, A)$ where S denotes the state space, and A denotes the transition matrix that defines the probability of going from any state to any other state of the system. The transition matrix defines the random process that is governed by the model, or equivalently, the distribution of state sequences that are generated by the model.

For the modeling of the distribution of words using Markov chains, first the state space has to be identified. Depending on the type of the word segmentation algorithm (implicit or explicit), there are two ways to define the state space, either based on: 1) the bounding box information; or 2) the transcription information. These two state spaces lead to two Markov chain models.

In the Markov chain model based on the bounding box information, the words bounding boxes are discretized into a number of non-overlapping equi-length frames (i.e. windows), and represent each frame with a separate state. Let $H_L=[b_1, b_2, \ldots, b_n]$ denote a word segmentation hypothesis for a text line L, where $b_i$'s represent the bounding boxes of the words hypotheses. The average height of the line $height\_avg_L$ is defined as the average of the heights of the bounding boxes in $H_L$. Then, the number of frames for a word bounding box $b_i$ is defined as the closest integer to the ratio of the length of $b_i$ to the average height of the line $height\_avg_L$.

In the Markov chain model based on the transcription information, each letter in a word is represented with a separate state; therefore, it is assumed that the number of letters in a word image is an observable variable for the model. If the transcription information for the test data is not available, the number of letters from the word image has to be estimated. For this purpose, a regression neural network that is trained based on Average Number of Transition (ANT) features is used.

The set of states is denoted by $S=\{s_1, s_2, \ldots s_N\}$, where $s_i$ is the state corresponding to words with i frames or i letters. In both models, we limit the number of states to a predefined maximum $N_{max}$. Therefore, any word with more than $N_{max}$ frames/letters is represented by $s_{Nmax}$. The Markov chain model for distribution of words is shown as a directed weighted graph in FIG. 11, where the nodes represent the states and the edges represent the transition probabilities between the states.

For the training of the Markov chain, that is to find the transition probabilities, the standard IAM database is used for both the bounding box-based and the transcription-based models. The ground-truth data of the IAM database is available at both the bounding box level and the transcription level for words and lines. In our experiments, we set $N_{max}$ to 15.

Hidden Markov Model

A Hidden Markov Model (HMM) can be thought of as a Markov chain with unobserved (i.e. hidden) states, where in each state the model generates an output token based on a stochastic process. In HMM modeling, it is assumed that it is only the sequence of output tokens that is observed, but not the underlying sequence of states. In other words, the most likely sequence of states has to be inferred from the sequence of output tokens.

A HMM is represented by a 5-tuple $\lambda=(S, A, V, B, \Pi)$, where S and A denote the state space and the state transition matrix that belong to the underlying Markov chain model. The three other elements are defined as follows: $V=\{v_1, v_2, \ldots v_M\}$ is the set of the observation symbols; B is the emission matrix that defines the probability of observing any observation symbol at any given state; and $\Pi$ is the set of initial state probabilities, that defines the chance of each state as being the first in the sequence of states that corresponds to the sequence of output symbols.

Specification of HMM for Modeling of Words Distribution

In the HMM-based approach to hypothesis testing for word segmentation algorithms, the hidden states correspond to the part of speech information (i.e. linguistic categories). All of the nine traditional linguistic categories that have been defined for English words are used. Table 1 shows these categories and their corresponding states.

TABLE 1

Linguistic categories as the hidden states for HMM-based modeling of words distribution

| Part of speech | State |
|---|---|
| Article | $s_0$ |
| Noun | $s_1$ |
| Pronoun | $s_2$ |
| Adjective | $s_3$ |
| Verb | $s_4$ |
| Adverb | $s_5$ |
| Preposition | $s_6$ |
| Conjunction | $s_7$ |
| Interjection | $s_8$ |

Figure 12:
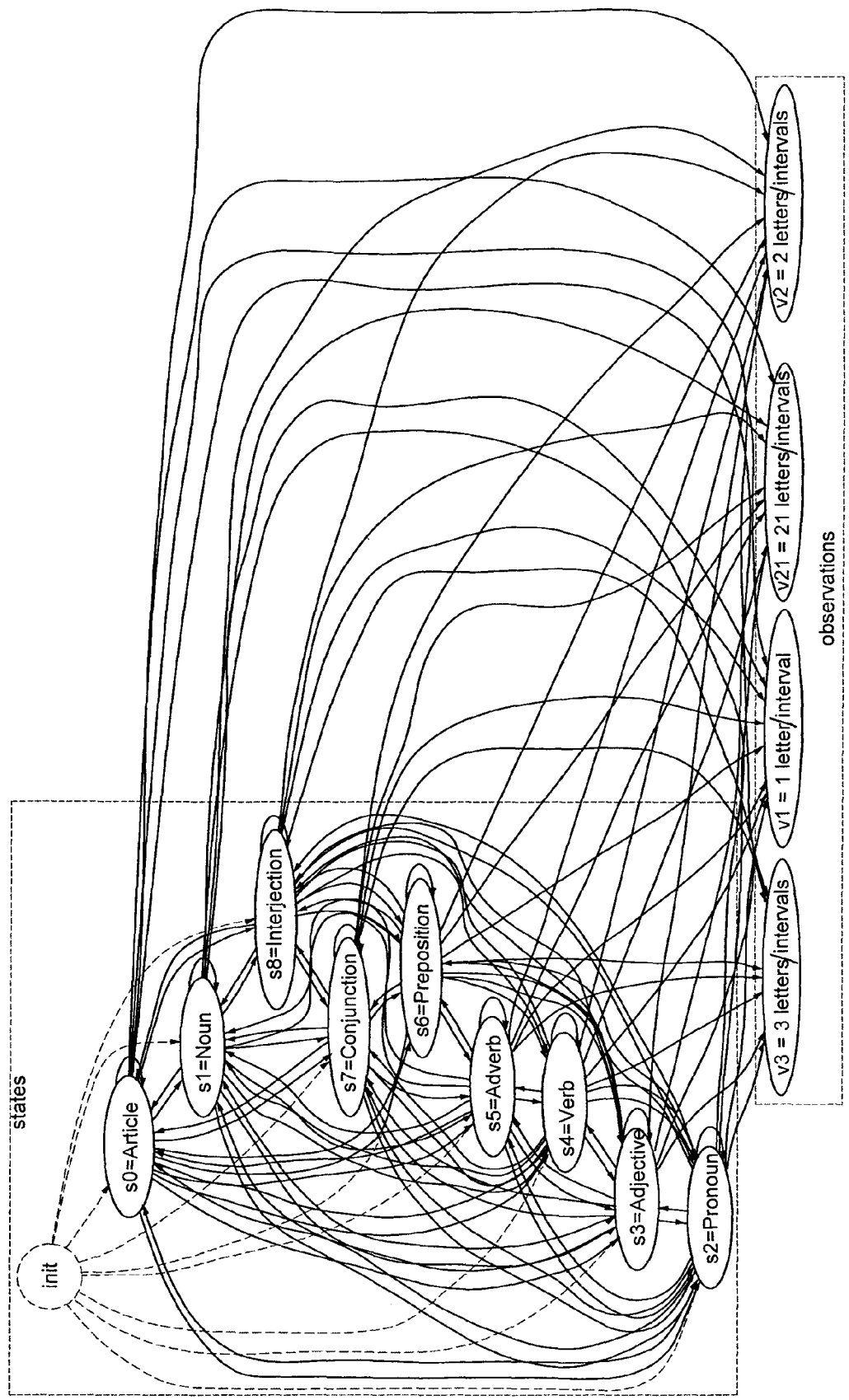
FIG. 12 is a directed weighted graph representation of an example of a Hidden Markov model for distribution of words.
Figure 13A:
FIGS. 13A to 13H are schematic representations of the results of applying main steps of character segmentation algorithm to a handwritten word.
Figure 13B:
Figure 13C:
Figure 13D:
Figure 13E:
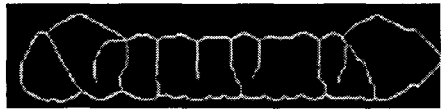
Figure 13F:
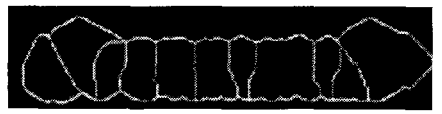
Figure 13G:
Figure 13H:

As for the observation symbols, either the number of frames or the number of letters in each word (which is available from the transcription information or estimated from the image) may be used. Similar to the Markov chain models previously discussed, these two different observation spaces lead to two different HMM models, which will be referred to as the bounding box-based HMM and the transcription-based HMM. The HMM model for distribution of words is shown as a directed weighted graph in FIG. 12. There are two clusters of nodes: states and observations. The edges between the state nodes represent the transition probabilities, and the edges between the transition nodes and the observation nodes represent the emission probabilities. The initial probabilities are shown as dashed edges between a dummy node named "init" and the state nodes.

For the training of the HMM models, the standard IAM database is used; as the ground-truth data contain the part of speech information, beside the bounding box and transcription information. The standard Baum-Welch algorithm is used in order to estimate the initial, transition and emission probabilities. However, as the Baum-Welch algorithm is based on a local optimization strategy, it is important to start the optimization process with good initial guesses in order to avoid local minima. For this purpose, the initial guesses for the transition and emission matrices can be estimated based on a few documents of the IAM database. Laplace (a.k.a. additive) smoothing is used in order to avoid zero probabilities for unknown events (i.e. events that do not appear in a limited set of training data).

Hypotheses Testing

Let $O=[o_1, o_2, \ldots o_T]$ be an observation sequence corresponding to a word segmentation hypothesis $H_L=[b_1, b_2, \ldots, b_T]$ for a text line L, where each $o_i$ is the number of frames or letters corresponding to a word $b_i$. Obviously, if only the bounding box information is available, we have to use the bounding box-based models. However, if the transcription information is available as well, or if the number of letters can be estimated from word images, we can use the transcription-based models.

In the Markov chain model, the system state corresponding to each observation symbol is already known. Therefore, the probability of the observation sequence can simply be computed as follows:

$$P(O|\mu)=\Pi_{i=1}^{T-1} A(s_{o_i}, s_{o_{i+1}}) \qquad \text{Equation 16}$$

In the hidden Markov model, $P(O|\lambda)$ can be computed using the forward or backward algorithms.

Having obtained the probability of observation sequence for a word segmentation hypothesis H, it must be determined whether H must be accepted as good segmentation or not. For this purpose, three statistical populations are needed: a population of perfectly segmented lines $\mathcal{D}_p$; a population of over-segmented lines $\mathcal{D}_o$; and a population of under-segmented lines $\mathcal{D}_u$. In the following, first is described the automatic generation of these three populations based on the IAM database, and then, the process of threshold selection for hypothesis testing.

Automatic Generation of Training Data

Having a collection of training documents that contain the transcription/bounding box information at line/word level, $\mathcal{D}_p$ is readily available from the ground-truth data. For the generation of $\mathcal{D}_o$ and $\mathcal{D}_u$, a method that is based on estimates of intra-word and inter-word distances as follows is proposed.

Estimation of Intra-Word and Inter-Word Distances

Let $L_I=\{l_1, l_2, \ldots, l_{n_l}\}$ denote the set of text lines in a document image I, where $l_i \cap l_j = \emptyset: \forall\ i \neq j$, and $I=\cup_{i=1}^{n_l} l_i$. Let $$C_{l_i} = \{c_1^{l_i}, c_2^{l_i}, \ldots c_{nc_{l_i}}^{l_i}\}$$

denote the set of connected components in a text line $I_i \in L_T$. Let $D_{I_i}$ be the set of distances between any connected component and its two closest neighboring connected components to the left and to the right within a text line $I_i \in L_T$. Let $D_T = \{D_{I_i}: \forall I_i\}$.

Assuming that the average intra-word distance is smaller than the average inter-word distance, we can obtain reasonable estimates for the intra-word and inter-word distances by clustering the distances in $D_T$ into two clusters. Using Otsu's method in order to find these two clusters, each cluster has a mean and a variance; Otsu's method minimizes the sum of variances of the two clusters. Choosing the smaller of the two means as the intra-word distance estimate, denoted by $w_{intra}$, and the larger of the two means as the inter-word distance estimate, denoted by $w_{inter}$.

Automatic Generation of Over-Segmented and Under-Segmentation Training Data

Having obtained estimates of average inter-word and intra-word distances, it is roughly known whether two neighboring connected components should be considered as part of the same word or not.

Let $c_m^l$ be a connected component in line $I \in L_T$. Let $c_{n\_left}^l$ and $c_{n\_right}^l$ be the closest left-side and right-side neighboring connected components to $c_m^l$ respectively. Let $$d_{c_m^l, c_{n\_left}^l}$$

denote the distance between $c_m^l$ and $c_{n\_left}^l$; similarly for $$d_{c_m^l, c_{n\_right}^l}.$$

For the generation of an over-segmented line, we only merge neighboring connected components that are closer than a certain percentage of $w_{intra}$. In our experiments, we used a range of threshold percentages between 0.5 and 0.9; that is, we consider $c_m^l$ and $c_{n\_left}^l$ as part of the same word if and only if $$d_{c_m^l, c_{n\_left}^l} < \rho_{over} \times w_{intra}$$

where $0.5 \leq \rho_{over} \leq 0.9$; similarly for $c_m^l$ and $c_{n\_right}^l$.

For the generation of an under-segmented line, all neighboring connected components that are closer than a certain percentage of $w_{inter}$ are merged. For example, a range of threshold percentages between 0.2 and 0.5 can be used; that is, $c_m^l$ and $c_{n\_left}^l$ are considered as part of the same word if and only if $$d_{c_m^l, c_{n\_left}^l} < \rho_{under} \times w_{inter}$$

where $0.2 \leq \rho_{under} \leq 0.5$; similarly for $c_m^l$ and $c_{n\_right}^l$.

Threshold Selection for Hypothesis Testing

Having obtained $\mathcal{D}_p$, $\mathcal{D}_o$, and $\mathcal{D}_u$, given a words distribution model $\psi$, three populations of words distribution probability corresponding to perfectly segmented lines, over-segmented lines and under-segmented lines are defined as follows, respectively referred to as $P\mathcal{D}_p$, $P\mathcal{D}_o$, and $P\mathcal{D}_u$:

$$P\mathcal{D}_p = \{P(d_i|\psi): \forall d_i \in \mathcal{D}_p\}.$$

$$P\mathcal{D}_o = \{P(d_i|\psi): \forall d_i \in \mathcal{D}_o\}.$$

$$P\mathcal{D}_u = \{P(d_i|\psi): \forall d_i \in \mathcal{D}_u\}.$$

Now, for the detection of a perfectly segmented line from an over-segmented or under-segmented line, the threshold is simply set to a value that minimizes the empirical classification error between $P\mathcal{D}_p$ and $P\mathcal{D}_o \cup P\mathcal{D}_u$.

Word Matching

Figure 3:
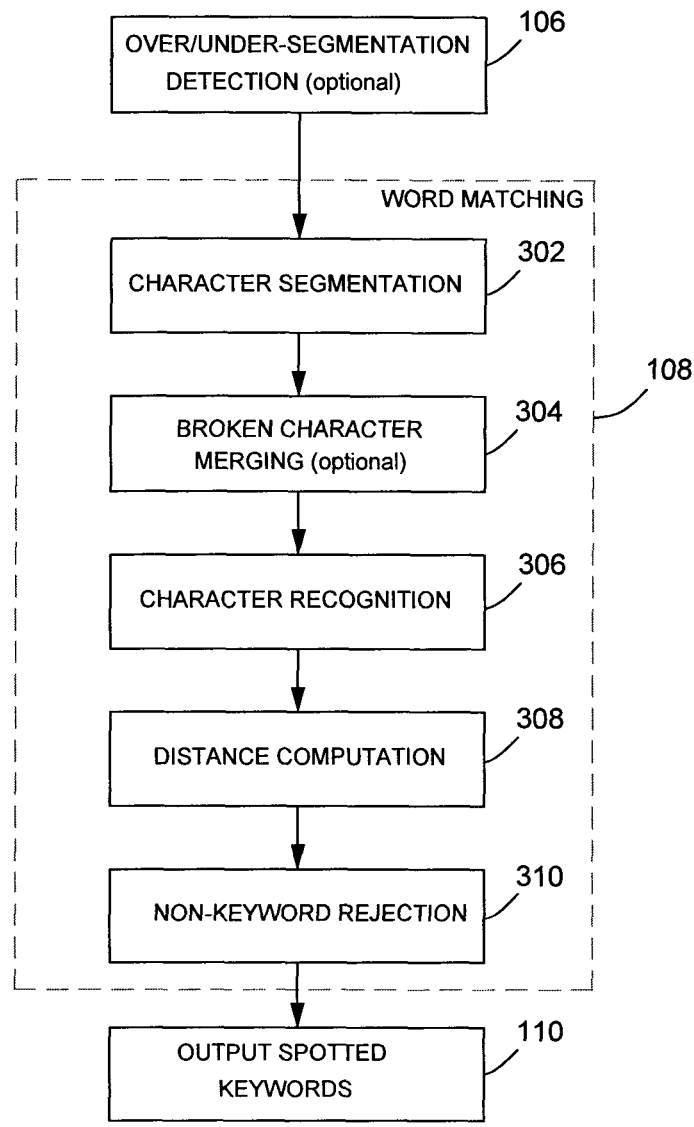
FIG. 3 is a flow diagram of the word matching step in accordance with an illustrative embodiment of the present disclosure.

Referring now to FIG. 3, there is shown a flow diagram of the word matching step performed at block 108 of procedure 100 (see FIG. 1). The sub-steps of step 108 are indicated by blocks 302 to 310.

Step 108 starts at block 302 where the character segmentation sub-step is performed in order to implicitly or explicitly divide each word into its constituent letters and, optionally at block 304, a broken character merging procedure may be applied to handle over/under-segmentation errors.

At block 306, the character recognition sub-step is performed in order to identify each letter and, at block 308, the distance computation sub-step is performed in order to recognize words based on character models, thereby obviating the need for having a database of handwritten words. This is accomplished by computing how far a word image (i.e. an image representing a word) is from a given text word using a distance function that will be referred to as the Generalized Minimum Edit (GME) distance. It will be shown later on that the GME distance can be computed by Ergodic Hidden Markov Models (EHMMs).

Finally, at block 310, non-keyword rejection (i.e. keyword/non-keyword separation) is performed. This is done using a special classifier that is based on a combination of Gaussian Mixture Models (GMMs), Hidden Markov Models (HMMs) and Support Vector Machines (SVMs). Therefore, this classifier is abbreviated as GHS.

The need for non-keyword rejection is rooted in the fact that any keyword recognition procedure recognizes any image with some degree of confidence. Ideally, the degree of confidence (or normalized distance or probability) for the correct hypothesis is 1, and for any incorrect hypothesis it is 0. However in practice, the degree of confidence rarely does have a value of exactly 0 or 1, but rather has a value between 0 and 1.

Therefore, in order to decide whether or not a word image is recognized correctly, the question of "how high is high?" (or "how low is low?") has to be answered. Traditionally, this question has been answered using a thresholding mechanism that accepts the recognition output if the confidence score is higher than a certain threshold or rejects the recognition output if the confidence score is lower than that threshold.

However, it is extremely difficult to select an appropriate value for the threshold that works for every document image, a threshold value that may work well for a set of document images might work poorly for another set of document images.

This is why the GHS classifier is proposed. In other words, the GHS classifier addresses the very core problem in keyword spotting, that is how to reject non-keywords, obviating the need for ad-hoc heuristic thresholding methods.

The keyword/non-keyword separation procedure using the GHS classifier will be detailed further on.

The character segmentation, broken character merging, character recognition and distance computation sub-steps will be further described below.

Character Segmentation

Holistic word recognition approaches cannot be relied upon because it is not possible to compile a large enough training database for all possible keywords. Consequently, a non-holistic (analytical) recognition method is desired, and so for general keyword detection each word is divided, either implicitly or explicitly, into its constituent letters.

Most of the conventional character segmentation methods known in the art are based on the analysis of projection profiles or candidate segmentation points, where in either case the 2D information in the image is not taken advantage of effectively. The segmentation paths generated are usually obtained without taking into account the constraints on character shapes and neighboring characters. One fundamental assumption in these algorithms is that characters are separable by vertical lines (after slant correction). This assumption is correct for machine-printed and simple cursive text, but not for complicated styles of handwriting. In general, where there is considerable amount of overlapping between neighboring characters, they are not separable by straight lines. In such cases, application of a typical character segmentation algorithm would result in some damaged characters (i.e. some characters with missing parts and some characters with parts from neighboring characters).

The character segmentation algorithm is based on background skeletal graphs using 2D data structures that correspond to arbitrary regions of the image, where any arbitrary character shapes can be circumscribed by a region or a sequence of regions. Consequently, the algorithm is capable of finding the correct boundaries of a character no matter how much overlapping it may have with neighboring characters.

Any character segmentation algorithm, be it implicit or explicit, needs more than only geometrical information in the word image in order to segment it perfectly. In other words, it is not always possible to perfectly segment a word image into its constituent characters without knowing the corresponding transcription. The reason is that a word image may represent more than one transcription. Therefore, the input word has to be segmented in all possible ways and then the ambiguity has to be resolved using the context, which is a lexicon in the simplest form. In order to generate all valid segmentation hypotheses, a new merging algorithm was developed based on graph partitioning.

Character Segmentation Based on Background Skeletal Graphs

A background skeletal graph is a geometric (location aware) graph corresponding to the skeleton of the background of the image. The main function of the algorithm is to keep the edges of the skeletal graph that correspond to possible segmentation paths. The decision whether or not an edge of the graph may correspond to a segmentation path is made based on the orientation, length and location of the edge.

Terminology of the Character Segmentation Algorithm

Let $G(V,E)$ be the skeletal graph corresponding to the background of the input word image I. G is a location-aware geometric graph where along with the neighborhood information the coordinates of vertices, and consequently the orientations of the edges, are kept. Then, we have the following definitions:

End-point: An end-point is defined as a vertex $v \in V$ with a degree of 1.

Junction-point: A junction-point is defined as a vertex $v \in V$ with a degree of greater than 2 (which is either 3 or 4 when the image is represented by a raster data structure).

Branch: A branch is defined as an edge $e \in E$ starting from a junction-point and ending in an end-point.

Curve: A curve is an edge $e \in E$ staring from an end-point and ending in an end-point.

Downward/Upward branch: A downward/upward branch is a branch whose start vertex lies on the upper/lower part of the graph.

EPD: An EPD denotes the end-point of a downward branch.

EPU: An EPU denotes the end-point of an upward branch.

BEPD: A BEPD denotes the branch corresponding to an EPD which goes below the baseline of the image.

BEPU: A BEPU denotes the branch corresponding to an EPU which goes above the baseline of the image.

Baseline: The baseline is defined, for a line of text, as the hypothetical horizontal line upon which most characters are written. The location of the baseline can be estimated using horizontal projection profiles.

Description of the Character Segmentation Algorithm

Figure 5:
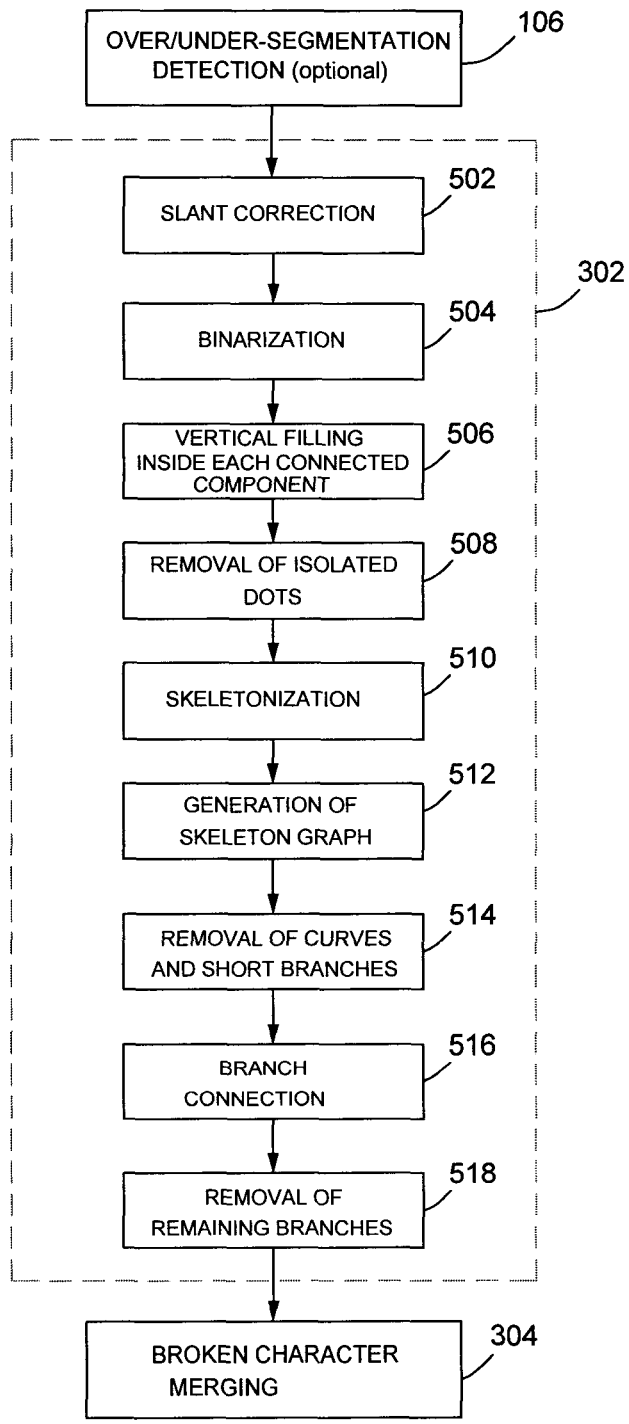
FIG. 5 is a flow diagram of the character segmentation sub-step in accordance with an illustrative embodiment of the present disclosure.

Referring to FIG. 5, in to form the character (or sub-characters) regions of the image from the skeletal graph, there is shown a flow diagram of an illustrative example of the character segmentation sub-step performed at block 302 of FIG. 3. The sub-steps of sub-step 302 are indicated by blocks 502 to 518.

Sub-step 302 starts with some pre-processing, namely slant correction at block 502, binarization at block 504, vertical filling inside each connected components at block 506 and removing isolated dots at block 508.

At block 510, the skeleton of the background of the image is computed and, at block 512, the skeletal graph corresponding to it is computed.

Then, at block 514, all curves and all short branches of the skeletal graph are removed, because they do not correspond to any segmentation path.

At block 516, each BEPD of the graph is connected to the nearest point on the skeletal graph that is below the baseline and each BEPU of the graph is connected to the nearest point on the skeletal graph that is above the baseline.

Finally, at block 518, all the remaining branches of the graph are removed.

The results of the above steps as applied to a handwritten word are shown in FIGS. 13A to 13H.

Broken Character Merging

The performance of a character segmentation algorithm is dropped by over-segmentation and under-segmentation errors. The output of a region-based segmentation algorithm is a list of disjoint regions corresponding to areas of image. Over-segmentation is defined as when there is more than one region whose union corresponds to one character. Under-segmentation is defined as when there is one region that corresponds to more than one character. For handling over-segmentation errors, a merging method based on graph partitioning is devised, and for detecting under-segmentation errors, a classification method based on fuzzy inference systems is proposed.

Character Merging Based on Graph Partitioning

Over-segmentation is unavoidable without recognition. In other words, an explicit character segmentation algorithm, without knowing what a character is, may have to over-segment it. Moreover, sometimes there may be intrinsic over-segmented characters which are due to noise, abrupt ink changes, binarization or even the writing style. Indeed, certain characters are composed of more than one region: a main body and an accent or some dots. In handwriting it is not always trivial to decide to which neighboring character a dot or accent belongs to.

The broken character merging algorithm was devised based on graph partitioning with a heuristic search.

Assuming that we have an input sequence of connected components where it is known that each one corresponds to either a character or a piece of a character. Some pieces need to be merged in order to form a sequence of characters out of the input sequence of characters and sub-characters. This problem may appear easy at first glance, however, in general it is a NP-complete problem. Simply, the number of possible ways to form a sequence of characters out of a sequence of broken characters may be too many. Without knowing what the sequence means, it is not known how to merge the broken characters. This is a chicken-egg dilemma for which one way to overcome is to generate all the possible hypotheses in the segmentation phase and then resolve the ambiguity using the context. For handwriting recognition, the context needed to find the most likely candidate among the possible hypotheses is usually a dictionary of words. However, in general a dictionary alone is not enough and a language model is employed as well. Therefore, over-segmentation is unavoidable without recognition/context, and the segmentation algorithm has to generate all the possible hypotheses.

The basic idea of the algorithm is to define a graph corresponding to the word image and then obtain the partitions of the graph that represent the different ways that the character pieces can be merged. Since graph partitioning is NP-complete and it is practically impossible to generate and then evaluate all the partitions, a heuristic was developed that can efficiently limit the search space to more promising partitions. Like any other heuristic search, theoretically the best solution is not guaranteed, however a good solution always is as will be shown further below.

First, the neighborhood relation by which we obtain the neighborhood graph is defined. Then, the graph partitioning algorithm will be presented.

Neighborhood Relation

The input to the merging algorithm is a sequence of connected components $S=\{s_0, s_1, \ldots, s_{N-1}\}$ where each one corresponds to either a character or a piece of a character. The goal is to merge some mergeable connected components of S in order to create sequences of a certain smaller size. Therefore, a neighborhood relation must be defined on the sequence in order to determine whether or not two connected components (in general two sequences of connected components) are mergeable. Two connected components are considered to be neighbors if they are close or have enough vertical overlapping. To be more precise, two connected components $s_i$ and $s_j$ are neighbors if the distance between them is below a certain threshold $D_{max}$, or if the amount of overlapping between their projections on the x-axis is above a certain threshold $O_{min}$. The distance between two connected components is defined as the minimum of the Euclidean distances between any two of their respective points. The performance of the algorithm is not sensitive to the values for these thresholds. A typical value for $D_{max}$ would be 5 pixels, and a typical value for $O_m$ would be 50%. The higher the value for $D_{max}$, and the lower the value for the more flexibility the algorithm has to merge the connected components.

Having defined the neighborhood relation, the graph G(V,E) is created from the sequence of connected components S, where each node $v_i \in V$ corresponds to one connected component $s_i$, and for each pair of neighboring connected components $s_i$ and $s_j$, there is an each edge $e_{ij} = <v_i, v_j>$.

Figure 14A:
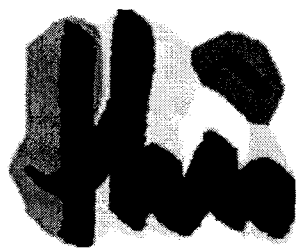
Figure 14A:
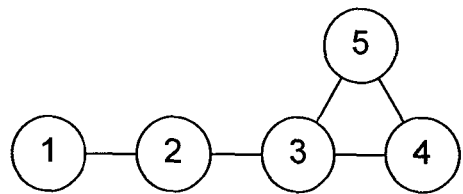

FIGS. 14A and 14B show an example of a neighborhood graph (FIG. 14B) corresponding to a handwritten word (FIG. 14A).

The neighborhood graph determines how the connected components in the sequence should be merged. Having created the neighbourhood graph G(V,E), it is partitioned into k parts $V^1, V^2, \ldots, V^k$ where the vertices in each partition determine the corresponding connected components that will be merged. In general, the number of parts k is between 1 (in which case all connected components will be merged together) to the number of vertices |V|=|S| (in which case no merging will be performed). However, in most cases the range of k can be limited. The number of parts is equal to the number of letters/digits of the word/numeral image, which can be estimated. Let $A_{avg}$ be the average aspect ratio (height to width ratio) for the characters, then for an word/numeral image I with $I_h$ rows and $I_w$ columns, the average number of characters $n_{chars}$ is $A_{avg} * I_w / I_h$. In order to eliminate the estimation errors, k can be set, for example as $k=n_{chars}-3$ to $n_{chars}+3$. It should be mentioned that in some applications such as word spotting, the value of k is known exactly, because a specific keyword with a known length is to be spotted in the document.

Graph Partitioning

Having defined the neighborhood graph G, the partitions of G are computed in order to find the mergeable connected components of S. However, all the possible partitions cannot be simply computed and then evaluated in order to choose the good ones, because the number of partitions is combinatorial in the number of nodes of the graph. For a complete graph with n nodes, the number of partitions is the n'th Bell number denoted by $B_n$. Even for small size problems the search space is too large to be exhausted. Therefore, a way to prune such a large space of partitions is needed. In other words, the goal is to generate a small set of partitions that is guaranteed to include the good partitions.

The proposed solution to this problem is a bottom-up one by using a heuristic to guide the search. The solution starts with the trivial partition of size n=|V| where each node (corresponding to a connected component) is in one and only one partition. Then, the number of partitions is reduced by 1 at each iteration by merging all mergeable partitions and then keeping the good ones for the next iteration. The good partitions are those ones with the highest scores. The score of a partition is a measure of how likely the corresponding sequence of connected components can be a sequence of characters. Two properties of text are used in order to define the measure. First, connected components (corresponding to letters or digits) have more or less the same width. Second, there is not much overlapping between connected components as the text is written horizontally. Therefore, a measure that favors sequences with more regularity and less overlapping over sequences with less regularity and more overlapping is desired.

The regularity measure that we define is based on the Arithmetic Mean-Geometric Mean (AM-GM) inequality which states that for any list of n non-negative real numbers $x_0, x_1, \ldots, x_{n-1}$ we have:

$$\frac{x_0 + x_1 + \ldots + x_{n-1}}{n} \geq \sqrt[n]{x_0 \cdot x_1 \ldots x_{n-1}} \quad \text{Equation 17}$$

That equality holds if and only if we have $x_0 = x_1 = \ldots = x_{n-1}$. A geometric interpretation of the AM-GM inequality is that, for n=2, a square has the largest area among all rectangles with equal perimeter. In general, an n-cube has the largest volume among all n-dimensional boxes with the same edge length sum.

Let $W = \{w_0, w_1, \ldots, w_{n-1}\}$ be the widths of a sequence of connected components S, if these $w_i$'s are considered as edge lengths of an n-dimensional box, then the sequence of connected component that is the most regular (in terms of widths) is an n-dimensional box which has the largest volume. Therefore, for a list of widths W, we define the regularity measure as follows:

$$R(W) = \frac{w_0}{\sum w_i} \cdot \frac{w_1}{\sum w_i} \cdot \ldots \cdot \frac{w_{n-1}}{\sum w_i} = \frac{\prod w_i}{(\sum w_i)^n} \quad \text{Equation 18}$$

Note that we each width $w_i$ has been divided by the sum of the widths in order to normalize the perimeter to 1. Thus, the maximum of R(W) is $$\frac{1}{n^n}$$

which is reached when $w_0 = w_1 = \ldots = w_{n-1}$. Since the goal is to combine R(w) with other measures for the computation of the total measure, it is divided by the maximum to derive the normalized regularity measure $R_{Norm}$:

$$R_{Norm}(W) = n^n \cdot \frac{\prod w_i}{(\sum w_i)^n} \quad \text{Equation 19}$$

Now, obviously $0 < R_{Norm}(W) \leq 1$. However, in practice $R_{Norm}(W)$ is implemented by taking logarithm of both sides in order to avoid overflows. Therefore, Equation 19 is rewritten as follows:

$$R_{Norm}(W) = \exp(n \ln(n) + \Sigma \ln(w_i) - n \ln(\Sigma w_i)) \quad \text{Equation 20}$$

$R_{Norm}(W)$ measures how regular a sequence of connected components is in terms of their widths. In order to quantify the amount of vertical overlapping between connected components, first the percentage of the overlapping $O_p$ between two line segments $L_i$ and $L_j$ is defined as follows:

$$O_p(L_i, L_j) = \begin{cases} 0 & \text{if } L_i \text{ and } L_j \text{ have no overlap.} \\ \frac{2|L_{i,j}|}{|L_i| + |L_j|} & \text{if } L_i \text{ and } L_j \text{ have some overlap where } L_{i,j} \\ & \text{is the line segment in common.} \\ 1 & \text{if } L_i \text{ is completely inside } L_j \text{ or vice versa.} \end{cases} \quad \text{Equation 21}$$

For a set of line segments $L = \{L_0, L_1, \ldots, L_{n-1}\}$, the normalized total amount of overlapping is defined as follows:

$$O_p(L) = \frac{2}{n(n-1)} \cdot \sum_{i=0}^{n-2} \sum_{j=i+1}^{n-1} O_p(L_i, L_j) \quad \text{Equation 22}$$

Which is the average amount of overlapping between all pairs of line segments in L. The minimum of $O_p(L)$ is 0 when there is no overlapping between any pairs of line segments, and the maximum is 1 when all pairs have complete overlapping.

Now, in order to define the score $S_G$ of a neighborhood graph G, we combine $R_{Norm}(W)$ and $O_p(L)$ in the following way:

$$S_G = R_{Norm}(W) \times (1 - O_p(L)) \quad \text{Equation 23}$$

The maximum of $S_G$ is 1, which is reached when the bounding boxes corresponding to the partitions have all the same width and there is no vertical overlapping between any pairs of bounding boxes.

Having defined the score for neighborhood graphs, the graph partitioning algorithm is shown in FIG. 6. The order of the algorithm is $O(N \times |E| \times (|V| - N_{min}))$, where $|E|$ is the number of edges of the neighborhood graph $G_0$, which is the number of pairs of connected components of S that are neighbors according to the neighborhood relation; $|V|$ is the number of vertices of $G_0$; $N_{min}$ is the desired minimum number of connected components in an output sequence of connected components; and N is the number of best graphs that are kept at each level of the search, for example N=50.

Detection of Under-Segmented Pairs of Handwritten Characters Using Fuzzy Inference System Under-segmented characters are the other type of error in the output of an explicit character segmentation algorithm. In the algorithm, under-segmented errors are the results of branches of the skeletal graph that are not deep enough to form a segmentation path. This may happen where neighboring characters are too close together, due to the writing style or improper binarization.

It is important to detect under-segmented characters as they adversely affect the process of word recognition and spotting. This is due to the fact that the output of a character classifier for a pair of characters that it has not been trained for is unpredictable.

For the detection of under-segmented pairs of characters a classifier based on a Fuzzy Inference System (FIS) is devised using a set of features called Average Number of Transitions (ANTs) that is specifically designed for this classification task.

Average Number of Transition (ANT) Features

The basic feature that distinguishes a binary image that represents more than one character from a binary image that represents one character (or part of a character) is the number of gaps in the image. The more gaps an image has, the likelier it is an under-segmented pair of characters.

The number of gaps in a row (or column) of a binary image is actually the number of transitions between black and white runs in that row (or column). Therefore, in order to estimate the average number of gaps for the whole image, the average number of transitions between black and white runs over all rows and columns of the image is computed. Most characters can be distinguished from under-segmented characters by counting the number of horizontal gaps only. However, for few characters such as 'm'/'M' and 'w'/'W' whose average number of horizontal gaps is 2 or more, the decision has to be made based on the number of horizontal and vertical gaps. The average number of vertical gaps for these characters is 0, which can separate them from a pair of under-segmented O's whose average number of vertical gaps is 1.

The ANT features are formally defined as follows. Let $I_{M \times N}$ denote a binary image with M rows and N columns that represents part of a character, a character or a sequence of characters. Let $R_i$ denote the i'th row, and $C_j$ denote the jth column of I where $0 \leq i \leq M-1$, and $0 \leq j \leq N-1$.

We define a salient white run in a row (or column) of an image as a long-enough sequence of white pixels that is surrounded by two long-enough sequences of black pixels on each side. A run is considered as long-enough if its length is greater than or equal to a threshold. We use two thresholds, one for white runs and the other one for black runs. Let $L_{Ri}^{W}(T_W, T_B)$ denote the number of salient white runs in $R_i$ where $T_W$ is the threshold for white runs, and $T_B$ is the threshold for black runs. These thresholds are used so as the average number of gaps is not sensitive to short runs that may correspond to noise. Assuming that in the binary image I, the background is represented by white pixels and the text is represented by black pixels, a reasonable value for $T_B$ would be somewhere between the minimum stroke width and average stroke width. For example, $T_B=2$ can be used, which means that the classification is not too sensitive to the value chosen for $T_B$ as long as the value is smaller than the average stroke width. For $T_W$, a range of values is chosen and then the average of $L_{Ri}^{W}(T_W, T_B)$ is computed over this range.

Let $T_{Wmin}$ be the minimum and $T_{Wmax}$ be maximum in the range of values for $T_W$. Then, the average number of gaps $G_{Ri}$ in the i'th row of I is defined as follows:

$$G_{Ri} = \left( \sum_{T_W = T_{Wmin}}^{T_{Wmax}} L_{Ri}^{W}(T_W, T_B) \right) / (T_{Wmax} - T_{Wmin} + 1) \quad \text{Equation 24}$$

For example, $T_{Wmin}$ is set to 2 and $T_{Wmax}$ to 4.

Having defined the average number of gaps, the set of features is defined as follows:

$F_{R01}$: Normalized number of rows with 0 or 1 gaps.
$F_{R2+}$: Normalized number of rows with 2 or more gaps.
$F_{R3+}$: Normalized number of rows with 3 or more gaps.
$F_{C0}$: Normalized number of columns with 0 gaps.
$F_{C1}$: Normalized number of columns with 1 gap.
$F_{C3+}$: Normalized number of columns with 3 or more gaps.

A number is normalized by dividing it by the length of the dimension that it is computed for, which is the number of rows of the image for $F_R$ features, and the number of columns of the image for $F_C$ features.

Besides these transition-based features, the Aspect Ratio (AR) of the image is defined as the last feature:

$F_{AR}$: ratio of the height of the image (M) to its width (N).

Fuzzy Inference System (FIS)

Having defined the features, the fuzzy sets on each feature need to be defined. The three basic membership functions for the definition of the fuzzy sets are given below.

Figures 15A, 15B, 15C:
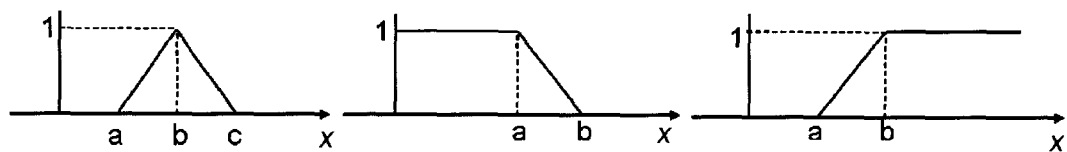
FIGS. 15A, 15B and 15C are graphical representations of three basic membership functions for the definition of fuzzy sets, namely triangular (FIG. 15A), shoulder left (FIG. 15B) and shoulder right (FIG. 15C)

Triangular: a triangle defined by the x-coordinates of the three vertices as shown in FIG. 15A.
ShoulderLeft: a trapezoid that extends to $-\infty$, thereby defined by the x-coordinates of the two vertices of the right boundary as shown in FIG. 15B.
ShoulderRight: a trapezoid that extends to $+\infty$, thereby defined by the x-coordinates of the two vertices of the left boundary as shown in FIG. 15C.

TABLE 2

Fuzzy sets defined on shape features.

| Variable | Fuzzy sets |
| --- | --- |
| $F_{R01}$ | HIGH := ShoulderRight$_{0.95,1.0}$ |
| $F_{R2+}$ | HIGH := ShoulderRight$_{0.1,0.2}$ |
| $F_{R3+}$ | HIGH := ShoulderRight$_{0.01,0.02}$ |
|  | TOO_HIGH := ShoulderRight$_{0.3,0.6}$ |
| $F_{C0}$ | HIGH := ShoulderRight$_{0.95,1.0}$ |
| $F_{C1}$ | HIGH := ShoulderRight$_{0.3,0.6}$ |
| $F_{C3+}$ | HIGH := ShoulderRight$_{0.1,0.2}$ |
| $F_{AR}$ | LOW := ShoulderLeft$_{0.2,0.33}$ |
|  | HIGH := ShoulderRight$_{2.0,3.5}$ |
| UnderSegmented | LOW := ShoulderLeft$_{0.25,0.5}$ |
|  | MEDIUM := Triangular$_{0.25,0.5,0.75}$ |
|  | HIGH := ShoulderRight$_{0.5,0.75}$ |
|  | TOO_HIGH := ShoulderRight$_{0.75,0.85}$ |

The fuzzy sets on each variable (the seven features and the output variable) are given in Table 2.

The complete rule base for the under-segmented detection FIS is defined as follows.

Rule #1. if $F_{C3+}$ is HIGH then Undersegmented is HIGH.
Rule #2. if $F_{AR}$ is not HIGH and $F_{R3+}$ is TOO_HIGH then Undersegmented is TOO_HIGH.
Rule #3. if $F_{AR}$ is HIGH and $F_{R01}$ is HIGH and $F_{C3+}$ is not HIGH then Undersegmented is very LOW.
Rule #4. if $F_{AR}$ is HIGH and $F_{R01}$ is HIGH and $F_{C3+}$ is HIGH then Undersegmented is LOW.
Rule #5. if $F_{AR}$ is HIGH and $F_{R01}$ is not HIGH then Undersegmented is MEDIUM.
Rule #6. if $F_{AR}$ is LOW and $F_{R01}$ is not HIGH then Undersegmented is HIGH.
Rule #7. if $F_{AR}$ is LOW and $F_{R01}$ is HIGH and $F_{C3+}$ is not HIGH then Undersegmented is MEDIUM.
Rule #8. if $F_{AR}$ is LOW and $F_{R01}$ is HIGH and $F_{C3+}$ is HIGH then Undersegmented is somewhat HIGH.
Rule #9. if $F_{AR}$ is not LOW and $F_{AR}$ is not HIGH and $F_{R0}$ is HIGH then Undersegmented is LOW.
Rule #10. if $F_{AR}$ is not LOW and $F_{AR}$ is not HIGH and $F_{R01}$ is not HIGH and ($F_{R2+}$ is HIGH or $F_{R3+}$ is HIGH) then Undersegmented is HIGH.
Rule #11. if $F_{AR}$ is not LOW and $F_{AR}$ is not HIGH and $F_{R01}$ is not HIGH and ($F_{R2+}$ is not HIGH and $F_{R3+}$ is not HIGH) then Undersegmented is MEDIUM.

Character Recognition

The character recognition algorithm is based on input perturbation and classifier combination. For each input pattern, firstly, a few versions of it slightly different in shape are generated, and then each one is recognized by an ensemble of neural networks. The idea behind the input perturbation is to make the classification more robust by submitting several slightly distorted versions of an input pattern along with the original pattern to a classifier and then combining the outputs.

Artificial Neural Network for Handwritten Character Recognition

The character recognition algorithm is based upon a feed-forward neural network with an enhanced training method that dynamically penalizes the weights of the neurons in order to improve the generalization performance. In the following, as an example, a feature set extracted from characters as well as the training mechanism will be briefly described.

Feature Extraction

A total of 363 features were extracted from each character image. These features include basic geometrical features, horizontal and vertical histogram features, Zernike moments, Fourier features, chain codes, and local gradient histogram features extracted from different zones of the input image.

Training

The architecture of the sample neural network is a 3-layer feed-forward with 363 neurons in the input layer, 130 neurons in the first hidden layer, 50 neurons in the second hidden layer, and 26 output neurons. The activation function for each neuron is a sigmoid ranging from 0 to 1. The back-propagation learning algorithm is used with momentum and regularization that were implemented by a weight penalization scheme.

In back-propagation learning with momentum, the weight update formula for each weight is defined as follows:

$$\Delta w_i(t) = -\rho \cdot \frac{\partial E}{\partial w_i(t)} + \alpha \Delta w_i(t-1) \qquad \text{Equation 25}$$

Where E is the error, and $\rho$ and $\alpha$ are the learning rates.

It is well known that in order to guarantee good generalization ability, the number of degrees of freedom or the number of weights must be considerably smaller than the amount of information available for training. Regularization is a common method for avoiding over-training or improving generalization ability. A regularization strategy was implemented by the so called weight decay scheme. A weight penalization term was added to the weight update rule (Equation 25) which leads to the following weight-update rule:

$$\Delta w_i(t) = -\rho \cdot \frac{\partial E}{\partial w_i(t)} + \alpha \Delta w_i(t-1) - \lambda \frac{1}{1 + \frac{1}{N_j - 1} \sum_{i=0}^{N_j - 1} |w_{ji}|} \qquad \text{Equation 26}$$

Therefore, each weight is penalized by an amount which is related to the sum of weights of the connections which are going to the same neuron.

Perturbation Method for Character Recognition

The perturbation method is a way of boosting performance in classifiers. Based on the assumption that an input pattern is distorted by a certain set of geometrical transformations, the perturbation method reduces the effect of distortion by classification of distorted versions of the input pattern. A set of geometric transformations, such as rotation, slant, erosion, dilation, etc., is selected. Ideally, this set contains all the possible transformations that may deform an input pattern. In order to classify an input pattern, all the geometric transformations in the set are applied to the pattern and then each distorted version is classified separately, and finally the results of the classifications are combined. The combination of classifier can be done by a fusion technique such as majority voting.

Figure 16A:
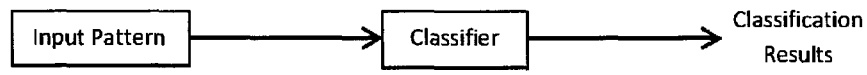
FIGS. 16A and 16B are high-level block diagrams of the perturbation method (FIG. 16B) versus the standard classification (FIG. 16A) for character recognition.
Figure 16B:
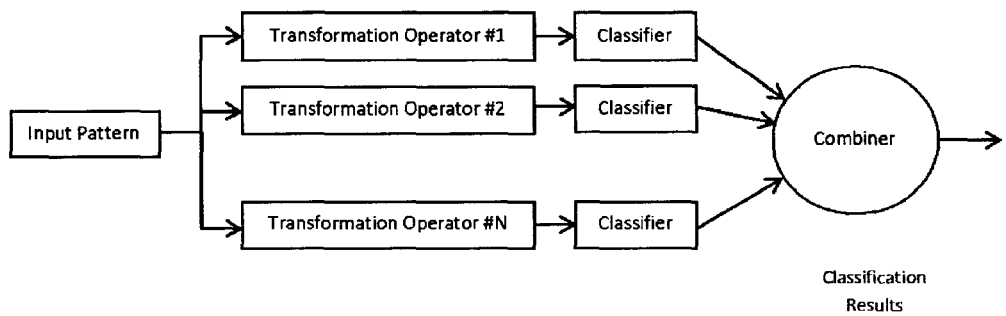

Referring to FIGS. 16A and 16B, there are shown high-level block diagrams of the perturbation method (FIG. 16B) versus the standard classification (FIG. 16A). It should be noted that in the basic perturbation method, the same classifier is used for all distorted (actually, anti-distorted) versions of the input pattern. However, in general different classifiers can be used in combination with different sets of transformation operators.

Transformation Operators

In the current implementation, eight transformation operators are used as listed below.
1. Identity transformation (returns the original pattern).
2. Rotation to the right by a random angle between 1° to 3°.
3. Rotation to the right by a random angle between 4° to 6°.
4. Rotation to the left by a random angle between 1° to 3°.
5. Rotation to the left by a random angle between 4° to 6°.
6. Stroke width normalization.
7. Horizontal dilation by a 1×3 structuring element.
8. Vertical dilation by a 3×1 structuring element.

Stroke width normalization is done by computing the skeleton of the pattern and the dilating it by a 3×3 structuring element.

Combination of Classifiers

There are several different approaches to the combination of classifiers hypotheses. Borda count is one of the most popular methods of combining rankings, thanks to its simplicity and effectiveness. Several variants of Borda count have been proposed in the pattern recognition community. In the present perturbation-based recognition approach, a modified Borda count is used and applied at character level. A summary of the modified Borda count is given below.

Modified Borda Count

The Borda count is a rank-based election method. In classifiers combination, each classifier can be considered as a voter, and each class as a candidate. Therefore, each classifier provides a ranking of classes, assuming that probabilistic or ranked classifiers are used. In the conventional Borda count, the winner is determined by giving each candidate a certain number of points corresponding to the position where it is ranked by each voter. Once all votes have been counted the candidate with the most points is the winner. The main advantage of conventional Borda count is that no voter can dominate the final decision. However, in classification problems the major disadvantage of the conventional Borda is that it ignores the confidence scores produced by different classifiers.

In order to overcome the disadvantage of the conventional method, the modified Borda adds three components to the conventional decision making process as follows:
1) The rank of a candidate is a percentage which is determined by the rank of the candidate among the top N candidates. Whereas in the conventional Borda, the rank of a candidate is the number of candidates that stand below it. The percentage-based rank in the modified Borda is calculated as follows:

$$\text{Rank}(C) = \begin{cases} 1 - \frac{\left(\begin{array}{c}\text{position of} \\ C \text{ in top } N \text{ candidates}\end{array}\right)}{N} & \text{if } C \text{ is among the top } N \text{ candidates} \\ 0 & \text{otherwise} \end{cases} \qquad \text{Equation 27}$$

Where C denotes a candidate (i.e. class), and position of C is a zero-based index. Therefore, for N=5 for example, the rank of the first candidate is 1, the rank of the second candidate is 1−1/5=0.8, and so on.

2) The percentage-based rank of a candidate is further adjusted by the confidence score that is assigned to the candidate by a voter (i.e. classifier). Let CSC denote the confidence score assigned to the candidate C. Then, assuming that the confidence score has a value in the range [0, 1], the percentage-based rank is simply adjusted as follows:

$$Rank_{CA}(C) = Rank(C) \times CS_C \qquad \text{Equation 28}$$

3) The confidence-adjusted rank (i.e. $Rank_{CS}$) that comes from each voter is further modified by a degree of credibility of the voter. The degree of credibility has a similar effect to the weight parameter in the weighted Borda count. In the simplest form, we can take the recognition rate of a classifier (computed on a validation set) as its degree of credibility. Then, in order to obtain the total rank of a candidate, the confidence-adjusted rank can be modified as follows:

$$Rank_{Total}(C) = Rank_{CA}(C) \times D_{cr} \qquad \text{Equation 29}$$

Where $D_{cr}$ denotes the degree of credibility of the voter.

The result of the election is obtained by adding up the total ranks that each candidate receives from all the voters.

Distance Computation

The main advantage of analytical recognition methods is their ability to recognize words based on character models, thereby obviating the need for having a database of handwritten words. In the word spotting context, there is a need to know how far a word image (i.e. an image representing a word) is from a text keyword. In other words, a distance function between word images and text keywords is needed. For this purpose, a variation of the edit distance (a.k.a. the Levenshtein distance) is used. The edit distance is a widely used measure of string similarity which was originally proposed for character strings with applications in spelling correction. However, since then many different variations of the basic edit distance have been proposed and applied to various problems including DNA analysis, fraud detection, pattern recognition etc.

In the following, firstly the classical edit distance where both sequences are character strings will be briefly explained. Secondly, the extension of the edit distance for the case where one sequence is a character string and the other sequence is an image will be described. Thirdly, it will be shown how to model the proposed edit distance by a Hidden Markov Model (HMM). Consequently, it will be shown that the costs for the edit operations can be learnt using the Expectation Maximization (EM) algorithm. Fourthly, it will be presented how to incorporate a priori knowledge into the edit distance using HMMs.

Classical Minimum Edit Distance

Let $\Sigma$ be a finite alphabet and $\Sigma^*$ be the set of all finite strings over $\Sigma$. Let $x = x_1 x_2 \ldots x_n$ and $y = y_1 y_2 \ldots y_m$ be two arbitrary strings of $\Sigma^*$ of length $n = |x|$ and $m = |y|$ respectively. Let $R^+$ be the set of nonnegative real numbers.

A string distance between x and y is characterized by a pair ($\Sigma$, $cost_e$) where $cost_e$: $E \to R^+$ is the primitive cost function, and $E = E_{substitute} \cup E_{insert} \cup E_{delete}$ is the alphabet of primitive edit operations. $E_{substitute} = \Sigma \times \Sigma$ is the set of substitutions, $E_{insert} = \{\epsilon\} \times \Sigma$ is the set of insertions, and $E_{delete} = \Sigma \times \{\epsilon\}$ is the set of deletions. Each such pair ($\Sigma$, $cost_e$) induces a distance function d: $\Sigma^* \times \Sigma^* \to R^+$ that maps a pair of strings to a nonnegative real value. The minimum edit distance $d(x,y)$ between two strings $x \in \Sigma^*$ and $y \in \Sigma^*$ is defined by the following recursive equation:

$$d(x, y) = \min \begin{cases} cost_e(a, b) + d(x'x'', y'y'') & \text{where } x = x'ax'' \text{ and } y = y'by'' \\ cost_e(a, \varepsilon) + d(x'x'', y) & \text{where } x = x'ax'' \\ cost_e(\varepsilon, b) + d(x, y'y'') & \text{where } y = y'by'' \end{cases} \qquad \text{Equation 30}$$

It should be noted that in the original version of the edit distance proposed by Levenshtein the cost of substitution, insertion and deletion is 1. However, as can be seen in Equation 30, these costs can be modeled by a function and they do not need to be the same. The calculation of Equation 30 can be done using dynamic programming in O(mn) time and space. However, depending on the application, the distance can be calculated in a shorter time. For example, if it is known that the distance between the two strings is small, then using lazy evaluation the equation can be calculated in O(m.(1+d) time, where d is the minimum edit distance.

Generalized Minimum Edit Distance

In general, the alphabets that the two strings are defined on do not need to be the same. That is, the minimum edit distance can be defined for two arbitrary strings $x = x_1 x_2 \ldots x_n$ and $y = y_1 y_2 \ldots y_m$ where $x_i \in \Sigma$ for $1 \le i \le n$ and $y_j \in \psi$ for $1 \le j \le m$.

In order to define the distance between a word image and a text string, what is needed is a sequence of image regions corresponding to characters or sub-characters of the word. The sequence of image regions is indeed the output of the character segmentation algorithm. Therefore, an edit distance between the two sequences x and y is characterized by a 4-tuple ($\Sigma$, $\psi$, $\mathcal{N}$, $cost_e$) where $\Sigma$ denotes the set of characters, $\psi$ denotes the set of image regions, $\mathcal{N}$ is the neighborhood graph for the regions, and $cost_e$: $E \to R^+$ is the primitive cost function which maps a primitive edit operation $e \in E$ to a real value.

As mentioned previously, the character segmentation algorithm has to over-segment certain characters without using the context knowledge. In order to handle over-segmentation, a set of merging operations is added to the set of basic edit operations. As it is known that the character segmentation algorithm may over-segment a character into up to three regions, only two merging operations need to be defined: 1) merging two neighboring regions, and; 2) merging three neighboring regions together. Therefore, the alphabet of primitive edit operations is defined as follows:

$$E = E_{c|\epsilon} \cup E_{\epsilon|r} \cup E_{c|rr} \cup E_{c|rrr} \text{ where}$$

$E_{c|\epsilon} = \Sigma \times \{\epsilon\}$ is the set of character insertions;

$E_{\epsilon|r} = \{\epsilon\} \times \Sigma$ is the set of region insertions;

$E_{c|r} = \Sigma \times \psi$ is the set of substitutions of regions by characters;

$E_{c|rr}=\Sigma \times \psi$ is the set of substitutions of 2-tuple of neighboring regions by characters; and $E_{c|rrr}=\Sigma \times \psi$ is the set of substitutions of 3-tuple of neighboring regions by characters.

Using these primitive edit operations, one can transform a sequence of characters to a sequence of image regions by either inserting a character, or inserting a region, or replacing a character by a region, or replacing a character by two neighboring regions, or replacing a character by three neighboring regions, and combinations of these operations.

The generalized minimum edit distance $d(x,y)$ between a sequence of characters $x \in \Sigma^*$ and a sequence of image regions $y \in \psi^*$ is defined by the following recursive equation:

$$d(x, y) = \min \begin{cases} \text{cost}_e(a, \varepsilon) + d(x'x'', y) & \text{where } x = x'ax'' \\ \text{cost}_e(\varepsilon, r) + d(x, y'y'') & \text{where } y = y'ry'' \\ \text{cost}_e(a, r) + d(x'x'', y'y'') & \text{where } x = x'ax'' \text{ and } y = y'ry'' \\ \text{cost}_e(a, rs) + d(x'x'', y'y'') & \text{where } x = x'ax'' \text{ and } y = y'rsy'' \\ \text{cost}_e(a, rst) + d(x'x'', y'y'') & \text{where } x = x'ax'' \text{ and } y = y'rsty'' \end{cases}$$

Equation 31

Where characters are indicated by a and b, sequences of characters are indicated by x' and x", image regions are indicated by r, s, and t, and sequences of image regions are indicated by y' and y".

Default Cost Functions

In the original version of the edit distance for character strings, the default cost function is 1, i.e. the cost of inserting a character, deleting a character or substituting a character by another character is 1. In the generalized edit distance which is defined between a sequence of characters and a sequence of image regions, the default cost functions is defined in a similar way. The default cost of inserting a region is set equal to the default cost of inserting a character equal to 1. However, for the substitution operations, the cost is obtained by the ensemble of neural networks. Let's denote the ensemble of neural networks by $\Omega$. Assuming the probabilistic classifiers are used, the process of feature extraction, recognition and voting can be modeled by a function that maps a pair of region and character to a real number in the range [0, 1], that is: $\Omega: \psi \times \Sigma \rightarrow [0, 1]$, where $\psi$ is the set of image regions, and $\Sigma$ is the set of characters.

Therefore, in order to determine the cost of substituting a region $r \in \psi$ by character $c_i \in \Sigma$, the region is recognized by the ensemble of neural networks and the cost is set as follows:

$$\text{cost}_e(c_i, r) = 1 - \Omega(r, c_i)$$

Equation 32

Therefore, ideally when the region represents the character, the cost is 0, and otherwise the cost is 1. The recursive definition of the generalized edit distance (Equation 31) based on the default cost functions is rewritten as follows:

$$d(x, y) = \min \begin{cases} 1 + d(x'x'', y) & \text{where } x = x'ax'' \\ 1 + d(x, y'y'') & \text{where } y = y'ry'' \\ 1 - \Omega(r, a) + d(x'x'', y'y'') & \text{where } x = x'ax'' \text{ and } y = y'ry'' \\ 1 - \Omega(rs, a) + d(x'x'', y'y'') & \text{where } x = x'ax'' \text{ and } y = y'rsy'' \\ 1 - \Omega(rst, a) + d(x'x'', y'y'') & \text{where } x = x'ax'' \text{ and } y = y'rsty'' \end{cases}$$

Equation 33

Modeling Generalized Minimum Edit Distance Using HMMs

The advantage of modeling the distance by using HMMs is twofold. First, there is a straightforward way to incorporate domain knowledge into the model. Second, the cost functions can be learned using training data.

Hidden Markov Models

A HMM is a statistical tool to model a system that is assumed to be a Markov chain with unobserved (i.e. hidden) states. A Markov chain is a random process for which the Markov property holds and the number of states that the process can be in is finite or countable. Therefore, a HMM can actually be considered as a nondeterministic Finite State Machine (FSM) where each state is associated with a random function. Within a discrete period of time t, the model is assumed to be in some state and generates an observation by a random function of the state. Based on the transition probability of the current state, the underlying Markov chain changes to another state at time t+1. The state sequence that the model passes through is unknown, only some probabilistic function of the state sequence that is the observations produced by the random function of each state can be seen. A HMM is characterized by the following elements:

N: The number of states of the model $S=\{s_1, s_2, \ldots, s_N\}$: The set of states $\Pi=\{\pi_i=P(s_1 \text{ at } t=1)\}$: The initial state probabilities $A=\{a_{ij}=P(s_j \text{ at } t+1|s_i \text{ at } t)\}$: The state transition probabilities M: The number of observation symbols $V=\{v_1, v_2, \ldots, v_M\}$: The set of possible observation symbols $B=\{b_i(v_k)=P(v_k \text{ at } t|s_i \text{ at } t\}$: The symbol emission probabilities $O_t \in V$: The observed symbol at time t T: The length of observation sequence $\lambda=(A, B, \Pi)$: The compact notation to denote the HMM.

With the following three constraints on the initial probabilities, transition probabilities and observation probabilities:

$$\sum_{i=1}^{N} \pi_i = 1 \qquad \text{Equation 34}$$

$$\sum_{j=1}^{N} a_{ij} = 1, \forall i \qquad \text{Equation 35}$$

$$\sum_{k=1}^{M} b_i(v_k) = 1, \forall i \qquad \text{Equation 36}$$

Three Fundamental Problems for HMMs

Most applications of HMMs need to solve the following problems.

Problem 1: Likelihood—Given a model $\lambda=(A, B, \Pi)$, how to efficiently compute $P(O|\lambda)$, that is the probability of occurrence of the observation sequence $O=O_1, O_2, \ldots, O_T$.

Problem 2: Decoding—Given the observation sequence O and a model $\lambda$, how to choose a state sequence $S=s_1, s_2, \ldots, s_T$ so that $P(O, S|\lambda)$, the joint probability of the observation sequence $O=O_1, O_2, \ldots, O_T$ and the state sequence $S=s_1, s_2, \ldots, s_T$ given the model, is maximized. In other words, finding a state sequence that best explains the observation.

Problem 3: Training—Given the observation sequence O, how to adjust the model parameters $\lambda=(A, B, \Pi)$ so that $P(O|\lambda)$ or $P(O, S|\lambda)$ is maximized. In other words, finding a model that best explains the observed data.

The solution to the likelihood problem is given by the so-called forward or the backward algorithm. The solution to the decoding problem is given by the Viterbi algorithm, and the solution to the learning problem is given by the segmental K-means or Baum-Welch algorithm.

Topologies of HMMs

The structure of the state transition matrix A determines the topology of the HMM. Through the use of topologies domain knowledge can be incorporated in the HMM. In classification, the topology of the HMM is a determining factor in performance of the system. One of the most widely used topologies in speech/text recognition is the so called Left-to-Right (LR) or Bakis model in which lower numbered states account for observations occurring prior to higher numbered states. The temporal order in LR-HMMs is imposed by introducing structural zeros to the model in the form of the constraint $\Pi=\{1, 0, \ldots, 0\}$ and $a_{ij}=0$, $i>j$ meaning that the model begins at the first (i.e. left most) state and at each time instant it can only proceed to the same or a higher numbered state. As a further constraint, in LR-HMM the number of forward jumps at each state is usually limited in order to restrict large state changes, i.e. $a_{ij}=0$, $j>i+\Delta$ for some fixed $\Delta$.

Referring to FIGS. 17A, 17B and 17C, there are shown two LR-HMMs, one with limited maximum forward jumps and the other one without, versus a fully-connected HMM where each state in the model is reachable from any state within one transition. Fully-connected HMMs are also known as ergodic HMMs.

LR topologies are the most straightforward models for 1D temporal signals such as speech. However, the image data is represented by a 2D matrix, where the temporal information is lost. The typical sliding window approach, where a narrow window is moved on the image from left to right (or vice versa), aims at recovering the temporal information from the 2D matrix representing the handwriting. Of course, when the handwriting is written cursively with a considerable amount of slant and overlapping between neighboring characters, the sliding window approach cannot provide a good 1D representation for the underlying 2D signal. In order to obviate this problem, multi-stream HMMs, 2D-HMMs and their variations have been proposed.

2D HMMs are natural extensions of traditional HMMs for 2D signals. However, it can be shown that when a 2D-HMM is modeled by an equivalent 1 D-HMM, the number of states is exponential, which means that the order of the decoding and learning algorithms is not polynomial anymore, but exponential. In order to reduce the complexity of 2D-HMMs, some authors have proposed topologies that are not fully-connected but rather composed of loosely-coupled super-states. Each super-state is usually a LR-HMM, and the complete model is formed by linking these super-states. These models are called Pseudo 2D-HMMs (P2D-HMMs). Given that the number of connections between the inner states of a super-state and the inner states of another super-state is zero or few, the order of the states required for the P2D-HMM is polynomial. For modeling images, a typical approach based on P2D-HMMs is to model each row of the image by one super-state, which is based on the unrealistic assumption that the states sequence in each row is independent of the states sequences of its neighboring rows. The reduction in the complexity of P2D-HMMs is obtained at the cost of over-simplifying the model based on somehow unrealistic assumptions.

The proposed HMM model is a Generalized HMM (GHMM) with an ergodic topology. The main property of the GHMM that is used is the relaxation of the additivity constraint of probability measures. The advantage of the proposed Generalized Ergodic HMM (GEHMM) over P2D-HMMs is to provide an exact model for the temporal information present in the handwriting with a feasible number of states.

Modeling Generalized Minimum Edit Distance Using GEHMMs

The direct extension of minimum edit distance or Dynamic Time Warping (DTW) methods to images when applied at pixel level is not efficient. This is due to the fact that the underlying Markov models are 2D-HMMs or P2D-HMMs which are either non-practical or over-simplified in general.

In the present proposed approach, the observation sequence is not image pixels, but rather image regions that correspond to characters or sub-characters. Thus, a model can be built whose states logically correspond to the edit operations (insertion, substitution and merging). Consequently, the number of states will be constant and small.

Figure 18:
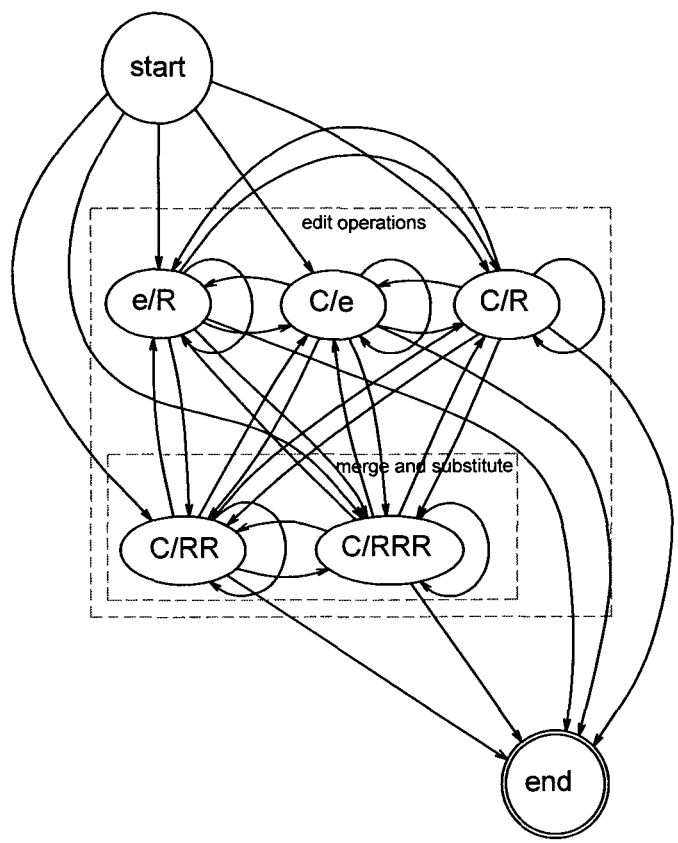
FIG. 18 is a schematic representation of an example of a HMM corresponding to the generalized minimum edit distance define by Equation 30.

Referring to FIG. 18, there is shown the HMM corresponding to the generalized minimum edit distance defined by Equation 31, where the five edit operations are models by five states: $S_{edit}=\{s_1, s_2, s_3, s_4, s_5\}$ with $s_1:=e|R$, $s_2:=C|e$, $s_3:=C|R$, $s_4:=C|RR$ and $s_5:=C|RRR$.

The output alphabet in this model is the set of image regions that is $O=R=\{f_i(x, y)|f_i:$ characteristic function corresponding to region $r_i\}$. Having assumed that the input image is binary; a region can be represented by a characteristic function. Formally, for a binary image with M rows and N columns, an arbitrary image region $r_i$ is denoted by the characteristic function $f_i: X \times Y \rightarrow \{0, 1\}$ where $x \in X$, $y \in Y$, $X:=\{0, 1, \ldots, M-1\}$ and $Y:=\{0, 1, \ldots, N-1\}$, and $f_i(x, y)$ is 1 if $(x, y) \in r_i$, and 0 otherwise.

Initial and Transition Probabilities

In the beginning, any edit operation can equally likely be used, thus the initial probabilities are the same: $\pi_i=1/5$, $1 \le i \le 5$.

Then, any edit operation can equally likely be used, thus the transition probabilities in each and every state are the same: $P(s_i|s_j)=1/6$, $1 \le i, j \le 5$. Note that from each edit state, the final state ("end") can be reached, therefore $5+1=6$ is the denominator.

Observation Probabilities

In the substitution state ($s_3:=C|R$), the probability of observing a region $r_i$ is the maximum probability that a character can describe $r_i$, which is determined by the ensemble of neural networks:

$$P(\text{observing } r_i \text{ as a single character}|s=s_3)=\max \Omega(r_i, c), c \in C \qquad \text{Equation 37}$$

Obviously, the interest is not only in computing the distance but also in recognizing the image, thus the character that best describes the region is kept as well $$\left(\text{i.e. } \underset{c}{\operatorname{argmax}} \, \Omega(r_i, c)\right).$$

The probability of observing 2-tuples of neighboring regions in $s_4:=C|RR$, and the probability of observing 3-tuples of neighboring regions in $s_5:=C|RRR$, is defined in a similar way. However, the neighborhood relations between regions have to be taken into account as well. In state $s_4$, the probability of observing region $r_i$ and region $r_j$ as a single character is defined as follows:

$$P(\text{observing } r_i \cup r_j \text{ as a single character}|s=s_4)=\max\{P(r_i \text{ and } r_j \text{ being neighbor and mergeable}).\Omega(r_i \cup r_j, c)\}, c \in C \qquad \text{Equation 38}$$

The probability of two regions being neighbor and mergeable is calculated as follows:

$$P(r_i \text{ and } r_j \text{ being neighbor and mergeable})=P(r_i \text{ and } r_j \text{ being mergeable}|r_i \text{ and } r_j \text{ being neighbor}).P(r_i \text{ and } r_j \text{ being neighbor}) \qquad \text{Equation 39}$$

The probability of two regions being neighbors is defined by the neighborhood graph $\mathcal{N}$:

$$P(r_i \text{ and } r_j \text{ being neighbor})=N(i, j) \qquad \text{Equation 40}$$

Where N is the weighted adjacency matrix corresponding to $\mathcal{N}$. Note that, in general, the neighborhood graph is a weighted graph with weights between 0 and 1. This allows for any two regions to be considered neighbors with a degree of truth between 0 and 1, rather than being either neighbor or not neighbor.

Assuming that the ensemble of classifiers is able to reject an input pattern that does not belong to any classes, any two regions can be merged given that they are neighbors. That is:

$$P(r_i \text{ and } r_j \text{ being mergeable}|r_i \text{ and } r_j \text{ being neighbor})=1 \qquad \text{Equation 41}$$

Therefore, we rewrite Equation 38 as follows:

$$P(\text{observing } r_i \cup r_j \text{ as a single character}|s=s_4)=\max\{N(i,j).\Omega(r_i \cup r_j, c)\}, c \in C \qquad \text{Equation 42}$$

In state $s_5$, the probability of observing regions $r_i$, $r_j$ and $r_k$ as a single character is similarly calculated as follows:

$$P(\text{observing } r_i \cup r_j \cup r_k \text{ as a single character}|s=s_5)=\max\{P(r_i \text{ and } r_j \text{ and } r_k \text{ being neighbor and mergeable}).\Omega(r_i \cup r_j \cup r_k, c)\}=\max\{P(r_i \text{ and } r_j \text{ and } r_k \text{ being neighbor}).\Omega(r_i \cup r_j \cup r_k, c)\}, c \in C \qquad \text{Equation 43}$$

The probability of three regions being neighbors is defined in terms of the probability of two regions being neighbors as follows:

$$P(r_i \text{ and } r_j \text{ and } r_k \text{ being neighbors})=\max\{P(r_i \text{ and } r_j \text{ being neighbors}). P(r_i \text{ and } r_k \text{ being neighbors}), P(r_i \text{ and } r_j \text{ being neighbors}). P(r_j \text{ and } r_k \text{ being neighbors}), P(r_i \text{ and } r_k \text{ being neighbors}). P(r_j \text{ and } r_k \text{ being neighbors})\} \qquad \text{Equation 44}$$

It is straightforward to extend Equation 43 to the case of more than three regions if necessary. In general, the probability of n regions being neighbors, given that the probability of any two pairs of regions being neighbors is known, is a Minimum Spanning Tree (MST) problem that can be solved by a number of classical algorithms including Kruskal's.

The region insertion state ($s_1:=e|R$) is to model regions that do not correspond to any characters. These are extra regions that correspond to background noise, misspellings or parts of characters from upper or lower text lines. By default, it is assumed that a region is equally likely to be extra or not, that is we set the probability of observing any region in $s_1$ to 0.5.

Similarly, the character insertion state ($s_2:=C|e$) is to model characters that do not correspond to any regions. This region allows for a handwritten word with some missing characters to be matched with a lexicon entry. A study of common misspellings shows that a double strike is the most likely cause of a missing character; that is where people forget to add the second character of a double character. As the likelihood of a double character occurring in a word is low, we can conclude that the likelihood of a character being absent in a word is much lower than the likelihood of it being present. By default, the probability of observing the empty region (denoted by the symbol e) in $s_2$ is set to 0.1. The probability of observing any non-empty region $r \in R-\{e\}$ in $s_2$ is 0. For the purpose of decoding (which will be explained further below), the inserted character is kept in this state. In this basic model, it is assumed that all characters are equally likely to be inserted. However, later on it will be shown how these likelihoods can be learnt from training data, so for example the insertion of character 'l' is more likely than 'z'.

It should be noted that the definitions of observation probabilities as above require the model to be a GHMM because the observation probabilities in each state do not sum to 1.

Decoding: Recognition of Handwritten Words Using the GEHMM Model

Having defined the initial, transition and observation probabilities, the model can be sued to recognize a handwritten word that is represented by a sequence of regions. The transcription of the handwritten word is simply obtained by decoding; i.e. finding the sequence of states that best describes the observation sequence. As mentioned previously, every state corresponds to a character, except for the insert region state ($s_1:=e|R$). It can be assumed that $s_1$ corresponds to the empty character. Thus, the transcription of the handwritten word is obtained by concatenating the characters that correspond to the most likely state sequence.

Incorporating A Priori Knowledge to GEHMMs for Handwritten Word Recognition

The GEHMM model that has been introduced is a versatile tool for the recognition of handwritten words. However, the basic 5-state model of FIG. 18 does not have any knowledge about the lexicon. Through the use of more states it will be shown that a priori knowledge about the lexicon, spelling errors and noise can be incorporated into the model.

The number of states that are needed to represent the a priori knowledge is proportional to the size of the alphabet. Therefore, compared to the basic model, the number of states is considerably higher, however still constant and manageable.

Adding Knowledge about the Lexicon

Character n-gram models provide the most straightforward way to incorporate knowledge about the lexicon into a Markov model. A character n-gram is a subsequence of n characters from a given sequence of characters. A character n-gram model is a probabilistic model for predicting the next character in such a sequence. In general, n-gram models can be used for any sequences from a finite alphabet. N-gram models have been widely used in statistical natural language processing, compression, speech and handwriting recognition.

The most widely used n-gram models are based on the shortest n-grams (n=1, 2 and 3) that are referred to as unigrams (n=1), bigrams (n=2) and trigrams (n=3). In the present method, only unigram and bigram models are used.

Formally, the task of predicting the next character can be stated as estimating the probability function P:

$$P(c_n | c_1, c_2, \ldots, c_{n-1}) = \frac{P(c_1, c_2, \ldots, c_{n-1}, c_n)}{P(c_1, c_2, \ldots, c_{n-1})}, c_i \in C \quad \text{Equation 45}$$

In other words, the goal is to use the history of the previous items (i.e. characters) to predict the next item.

Let Count($c_1 c_2 \ldots c_{n-1}$) be the frequency of the sequence $c_1 c_2 \ldots c_{n-1}$, and Count($c_1 c_2 \ldots c_n$) be the frequency of the sequence $c_1 c_2 \ldots c_n$ in the training data (i.e. lexicon). Now, the Maximum Likelihood Estimate (MLE) for the probability of a certain n-gram $c_1 c_2 \ldots c_n$ is defined as follows:

$$P(c_1, c_2, \ldots, c_n) = \frac{\text{Count}(c_1 c_2 \ldots, c_n)}{N}, c_i \in C \quad \text{Equation 46}$$

Where N is total number of all n-grams appearing in the training data. The MLE estimate for the conditional probability function P is defined as follows:

$$P_{MLE}(c_n | c_1, c_2, \ldots, c_{n-1}) = \frac{\text{Count}(c_1 c_2 \ldots, c_{n-1})}{\text{Count}(c_1 c_2 \ldots c_n)}, c_i \in C \quad \text{Equation 47}$$

In particular, using the MLE estimates the character unigram model is defined as follows:

$$P_{MLE}(c_i) = \frac{\text{number of words in the lexicon starting with character } c_i}{\text{total number of words in the lexicon}}, c_i \in C \quad \text{Equation 48}$$

And the character bigram model is defined as follows:

$$P_{MLE}(c_i | c_j) = \frac{\text{number of occurances of } c_j c_i \text{ in all words in the lexicon}}{\text{total number of occurances of } c_j \text{ in all words in the lexicons}}, c_i, c_j \in C \quad \text{Equation 49}$$

The unigram model specifies the initial probabilities and the bigram model specifies the transition probabilities in the GEHMM model.

The character unigram model estimates the probability of observing a certain character in the beginning of a word, which is the initial probability of going to a state that represent the character in the GEHMM model. The character bigram model estimates the probability of observing a certain character given that the previous character is known, which is the transition probability of going from the state that represents the previous character to the state that represents the desired character.

Figure 19:
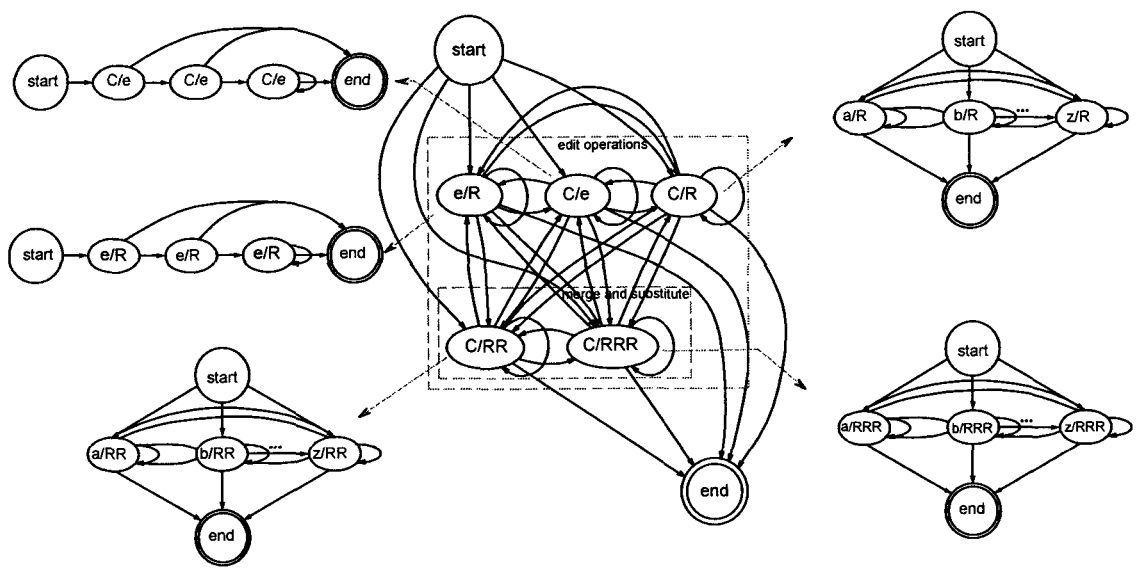
FIG. 19 is a schematic representation of an example of a 159-state enhanced GEHMM model for word recognition.

Accordingly, in order to include the unigram and bigram models into the GEHMM model, there needs to be a separate state for any character. Therefore, each character state ($s_1$, $s_2$, $s_3$ and $s_4$) in the 5-state model of FIG. 18 has to be decomposed to 26 states. Region insertion state ($s_1$) also needs to be decomposed into a few states, which allows for the model to impose a constraint on the number of regions that can be inserted consecutively. It is assumed that in the process of matching a word with a sequence of image regions, the insertion of 3 regions in a row and the insertion of more than 3 regions in a row are equally unlikely events. Therefore, we decompose $s_1$ into 3 states. The same constraint can be imposed on the character insertion state ($s_2$). Therefore, the character insertion state ($s_2$) in the 5-state model has to be decomposed into 3×26=78 states. FIG. 19 shows the whole model that is composed of 6×26+3=159 states.

Figure 20:
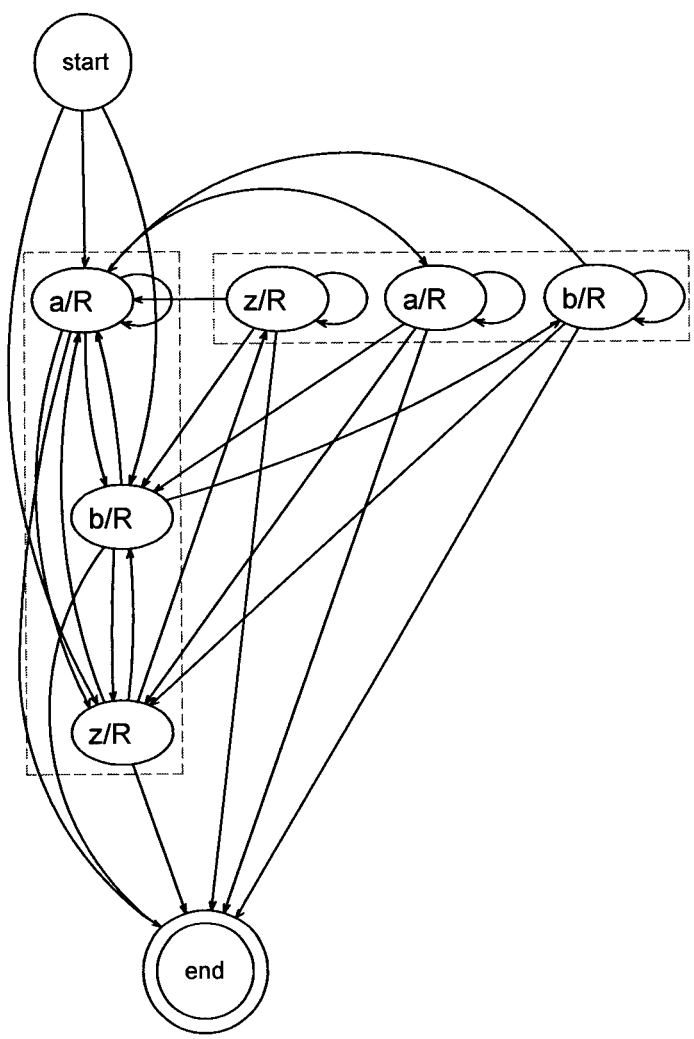
FIG. 20 is a schematic representation of an example of a decomposition of the character substitution state based on the character trigram model.

If it is desired to incorporate more knowledge about the lexicon into the model, character trigram models can be sued at the cost of more states. In order to represent the trigram model, each character state ($s_1$, $s_2$, $s_3$ and $s_4$) in the 5-state model of FIG. 18 has to be decomposed to 2×26=52 states because a history of size 2 (i.e. all possible pairs of characters) must be shown. The decomposition of the character substitution state based on the character trigram model is shown in FIG. 20. Therefore, the GEHMM model based on the character trigram model will have 6×2×26+3=315 states.

Non-Keyword Rejection

Any keyword spotting system can be thought of as being composed of two major components: segmentation and decision. The responsibility of the segmentation component is to decompose the input image, as previously described, into a set of sub-images that must contain the keywords. These sub-images are referred to as words hypotheses. The responsibility of the decision component is to decide whether a sub-image in the set of words hypotheses is a specific keyword or not.

The inherent difficulty in the decision component is that in general only the lexicon of keywords is known. More precisely, the lexicon of keywords is closed; however, in general, the lexicon of non-keywords is not closed. In mail documents for example, there is always a possibility of new words such as names that the keyword spotting system has not seen before, and yet it must be able to reject these words as non-keywords. Furthermore, it should be noted that since it is not always possible to perfectly segment a document image into its constituent words without having the recognition information, in general more than one word segmentation hypothesis corresponding to each text line in the document has to be produced. The set of words hypotheses may inevitably contain some incorrectly-segmented words among correctly-segmented keywords and non-keywords. The decision component in the keyword spotting system thus must be able to reject incorrectly-segmented words as well.

Therefore, there needs to be a way of separating keywords from non-keywords as well as incorrectly-segmented words. In the following, the term "non-keyword" will simply refer to everything but keywords. Therefore, the decision component can conceptually be divided into two sub-components: detection and recognition. The detection sub-component decides whether or not the word image (i.e. word hypothesis) is a keyword. The recognition sub-component assigns the word image to a keyword class, given that it is a keyword. It is to be understood that the detection sub-component may alternatively be referred to as the rejection step since the rejection of non-keywords is equivalent of the detection of keywords.

Traditional Approaches to Rejection of Non-Keywords

The rejection in traditional keyword spotting systems is achieved by simplistic methods that are not always based on realistic assumptions. The most widely used approaches to non-keyword rejection fall under the category of score thresholding methods. The decision whether or not the input image is a keyword is made based on the confidence score(s) that the recognition engine assigns to the word image. As previously mentioned, the basic idea is to compare the confidence score with a certain threshold; if the confidence score is lower than the threshold, the input image is rejected (classified as non-keyword), otherwise the word image is accepted (classified as keyword).

There are two main problems with the score thresholding approaches to non-keyword rejection. First, the threshold has to be chosen over a limited set of documents, and then it will be fixed during the application of the keyword spotting system. This means that if the threshold for a new document is too low, the system may spot almost every word in the document; and if the threshold is too high, the system may spot nothing. Second, there is no guarantee that the recognition procedure can reliably assign lower confidence scores to all classes of non-keywords. Due to the inherent ambiguity in handwritten letters, it is possible that certain classes of non-keywords get high confidence scores when interpreted as keywords.

Machine Learning Approaches to Binary Keyword/Non-Keyword Classification

In order to overcome the shortcomings of traditional score thresholding methods, the present disclosure proposes a systematic approach to the separation of keywords from non-keywords based on standard machine learning algorithms.

Figure 21A:
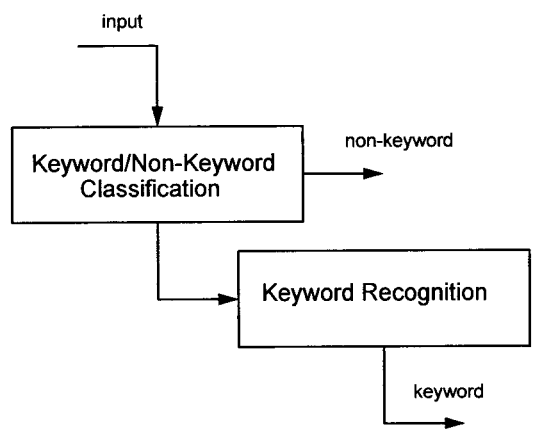
FIGS. 21A and 21B are schematic representations of the reject-first (FIG. 21A) and reject-last (FIG. 21B) decision models in recognition-based keyword spotting.
Figure 21B:
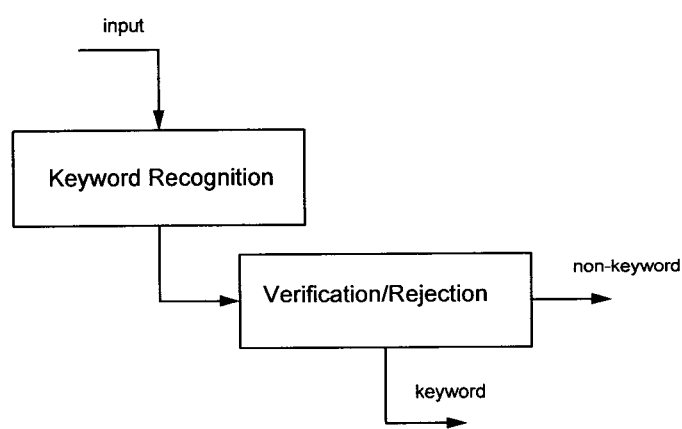

There are two possible realizations for the decision component in keyword spotting, based on whether the rejection of non-keywords is performed before or after the recognition of keywords. Referring to FIGS. 21A and 21B, there are illustrated these two decision models will be referred to as reject-first (FIG. 21A) and reject-last (FIG. 21B).

The traditional score thresholding methods previously discussed are instances of reject-last models.

In reject-last models, the decision whether or not the word image is a keyword is made in the space of recognition scores. Most often the decision is made based on the top-1 recognition score. However, a number of possibilities have been proposed in order to augment the decision making process, such as the utilization of top-2 and top-3 recognition scores or the normalization of scores by the Universal Background Modeling (UBM) technique. The basic idea behind the UBM-based score normalization technique is to learn a background model that estimates the distribution of all words in a feature space. The feature space is typically defined by temporal features (statistical/structural) or the recognition scores corresponding to the input image; and the background model is normally estimated by Gaussian Mixture Models (GMMs). The recognition likelihood for a word image is then normalized by the background likelihood that is computed by the background model.

Figure 22:
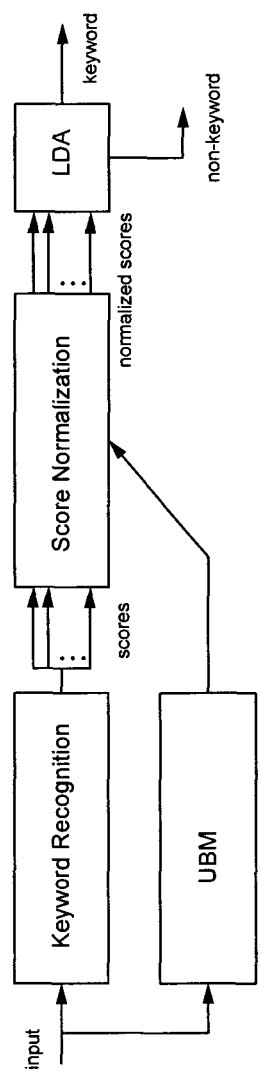
FIG. 22 is a schematic representation of the general reject-last recognition-based keyword spotting approach enhanced with score normalization.

The advantage of the reject-last models approach is to entail little or no training cost once the keyword recognition engine is available. In the basic thresholding approaches, the optimal threshold can be determined by a simple Linear Discriminant Analysis (LDA). Even with the enhanced thresholding approaches based on UBM, the learning of the GMM does not require labeled training data, and furthermore, it can be learnt in advance. Referring to FIG. 22, there is shown the outline of a general reject-last approach enhanced with the UBM score normalization technique.

The disadvantage of reject-last approaches is to make the decision in the space of confidence scores that are computed by the keyword recognition engine, and as mentioned earlier, it is not guaranteed that the keyword recognition procedure is always able to assign lower confidence scores to all classes of non-keywords. In other words, reject-last approaches indirectly/poorly use the distribution of non-keyword classes. Therefore, the proposed keyword spotting system is based on a reject-first approach which will be detailed further on.

The main idea behind the reject-first approaches is to directly model and use the distribution of non-keyword classes in the decision making process. It has been shown through numerous studies that the recognition performance of word recognition engines is inversely proportional to the size of the lexicon. State-of-the-art handwriting recognition algorithms achieve very high performances on small size lexica (several tens of words). However, they achieve poorly on large size lexica (tens of thousands of words). In keyword spotting applications, the lexicon of keywords is limited and small, typically between one to a few tens of words. Therefore, the success of reject-first approaches greatly depends on the performance of the binary keyword/non-keyword classification step. Furthermore, the training of the binary keyword/non-keyword classifier requires labeled training data at the word-level. Therefore, for the reject-first decision model, two basic questions have to be answered: 1) how can labeled training data be obtained for arbitrary sets of keywords and non-keywords and 2) how can a binary classifier be efficiently learned for the separation of keywords from non-keywords.

To answer the first question, several facts about the nature of arbitrary word spotting applications have to be considered. First, the lexicon is open and domain-dependent. Second, the lexicon of keywords is user-dependent and thus may be different in every application of the keyword spotting system. Third, for a typical machine learning algorithm to obtain reasonable estimates of the underlying distributions, a few hundred samples per class are normally needed. Combining these facts simply means that to compile a database of real handwritten words for arbitrary keyword spotting is impractical. Therefore, in order to train the binary keyword/non-keyword classifier for arbitrary keyword spotting, either real handwritten letters or artificial handwritten words have to be relied on. In the former method, samples for handwritten words are synthesized by the concatenation of handwritten letters in a coherent and smooth manner. In the latter, handwritten fonts are used and then appropriate random geometrical transforms are applied to the synthesized images in order to compensate for the effect of random variations that is inherent in real handwriting. In the present disclosure, the latter approach is being used and will be explained in more details.

Generation of Training Data

A tool for the automatic generation of training images from arbitrary text entries is created based on a collection of handwritten fonts. In a sample application a collection of 213 fonts are used, all of which are freely available from the web. The writing styles present in this collection of handwritten fonts mimic several typical real-world cursive styles. However, no matter how close individual characters in a handwritten font might look to real handwritten characters, all instances of the same character in the generated word image will look exactly the same. While in real handwriting almost no two instances of the same character in the handwriting of an individual are exactly the same. Therefore, in order to narrow the gap between artificial and real handwritten data, it is desired to apply appropriate random changes to the images that are generated based on fixed handwritten fonts.

A number of geometrical transforms have been studied in this context including projective transform, shear mapping and smooth warping transform, and it was found that the random smooth warping transform is a suitable choice. It is to be understood that other transforms may be used as well. The three conditions for an ideal transform in this context are: 1) it must retrain the continuity of the original word image; 2) it must introduce random changes to different instances of the same character; and 3) it must not produce unrealistic changes to the original word image. The random smooth warping transform always satisfies condition 1), and most of the time, conditions 2) and 3).

Feature Extraction

Different approaches to feature extraction for pattern recognition problems fall under the categories of local vs. global and structural vs. statistical. Therefore, the four major categories are local-structural, local-statistical, global-structural and global-statistical. In the context of handwritten words, the basic idea behind local approaches is to extract the features from local neighborhoods of the image in a way to (partially) reconstruct the temporal dependency of the input signal. Global approaches, on the other hand, aim to extract features that are independent of transient changes in the input signal. Regardless of whether a local or global approach is taken, the image can be represented with either structural features such as the number of loops, branch/junction points etc. or statistical features such as the edge or power spectral density.

Out of these four major approaches, the global structural category in is excluded as it cannot provide enough discriminative capacity for handwritten words, particularly for large number of classes. As examples of local-statistical and global-statistical features gradient-based and Gabor-based features were studied, which are among the most successful feature extraction methods for handwritten letters/numerals. It should be noted that statistical features can be extracted from the whole image or from smaller windows (a.k.a. frames) of the word image. In the former case, the feature extraction method is categorized as global, while in the latter case, as local.

As an example of a local-structural method we choose the so-called Local Minima Maxima (LMM) features. Referring to FIGS. 23A, 23B and 23C the LMM features extract the set of minima points MI on the lower external contour and the set of maxima points MA on the upper external contour of the word image and then represent each of these points by a set of descriptors such as the number of peaks above/below, the contour length etc.

It should be noted that the feature extraction method may affect the choice of the learning algorithm. Generally speaking, local features call for more elaborate classification techniques because in general, the resultant feature vectors may not be fixed-length, but variable-length (normally proportional to the length of the image).

Learning Algorithms

Results of previous research show that the most successful learning algorithms in the realm of handwritten recognition are LDA, Neural Networks (NNs), Support Vector Machines (SVMs), k-Nearest Neighbor (k-NN) and Hidden Markov Models (HMMs).

The LDA algorithm is suitable for reject-last approaches because the feature space is simply composed of recognition scores (normally only top-1 recognition scores). However, for more general feature spaces that may be encountered in reject-first approaches, more sophisticated classifiers are needed such as NNs, SVMs and HMMs. It is straightforward to use fixed-length features with all of these learning algorithms. However, the difficulty in using variable-length features such as LMM is to incur distance functions that must be defined on sequences (i.e. variable-length vectors).

There are two general approaches to using variable-length features inside machine learning algorithms, either explicitly or implicitly. In explicit approaches the features are compared with optimal alignment methods such as Dynamic Time Warping (DTW) or the Generalized Minimum Edit (GME) distance that were introduced previously. In implicit approaches, on the other hand, the features are modeled with generative models such as HMMs or kernel methods. In general, explicit approaches are easier to implement but less computationally efficient than implicit approaches to using variable-length features. Therefore, for the purpose of the present disclosure, the most straightforward classification method based on the LMM features is k-NN with DTW distance.

TABLE 3

Major categories of approaches to separation of keywords and non-keyword in our experimental evaluations.

| Name | Feature Extraction | Learning Algorithm | Further Comments |
|---|---|---|---|
| Normalized Score Thresholding | recognition scores | LDA | Recognition scores are normalized using UBM technique. |
| Global-Statistical Binary Classification | gradient, Gabor | NN, SVM | Features are extracted from the whole image. |
| Local-Statistical Binary Classification | gradient, Gabor | NN, SVM | Features are extracted from equal-sized frames. |
| Local-Structural Binary Classification | LMM | k-NN | Feature vectors are compared with DTW distance. |

Experimental Results

Based on the above discussions on feature extraction methods and learning algorithms, four major categories of approaches to the separation of keywords and non-keywords as summarized in Table 3. Different experiments were carried on randomly selected sets of keywords and non-keywords over English and French vocabularies.

Extensive experiments indicate that the local-structural binary classification approach based on the LMM features and k-NN classifier shows a significantly higher accuracy over the other alternatives (roughly ~90% versus ~60% on average). However, this increased gain in performance comes at the price of much higher memory and CPU requirements. This is due to the fact that the k-NN classifier postpones all the computations until classification. In other words, the decision boundaries between the keywords and non-keywords classes are implicitly computed every time for each new word that we wish to classify. For this purpose, the k-NN classifier has to keep all the training samples (in the feature space); and during the runtime, it computes the distance between a new word image to every training sample (in the feature space). So it can easily be seen that with a modest lexicon size of a few thousand words and a only a few hundred samples per word, the amount of memory required to store the feature vectors is in order of gigabytes, and the number of distance computations that the CPU has to carry out is in order of billions.

To get an idea of the cost of the k-NN+LMM approach, the lexicon was limited to only 500 words (containing ~50 keywords and ~450 most frequent non-keyword). With only ~200 training samples per word, the memory consumption was around 2 GB, and the processing time for a document image was around 2-3 minutes. This simply means that the k-NN+LMM approach is insufficient to address the practical concerns of a general keyword spotting system. Therefore we studied the possibility of replacing the k-NN classifier with a more efficient learning method while keeping the LMM features.

GHS Method for Binary Classification of Keywords and Non-Keywords

In order to address the practical concerns of the k-NN+LMM approach, combinations of explicit Dynamic Time Warping (DTW) kernels and variants of Fisher kernels based on Hidden Markov Models (HMMs) and Gaussian Mixture Models (GMMs) with one-class and two-class Support Vector Machines (SVMs) were investigated. The conclusion was that the same classification performance was achievable with much less computational requirements using HMM/GMM kernels with two-class SVMs.

In the present disclosure, which is referred to as GHS for short (G for GMM, H for HMM and S for SVM), the non-keyword classes are modeled using GMMs, and the keyword classes using HMMs. The GMMs or HMMs in this context can be thought of as instances of the Fisher kernel. Each GMM/HMM model (or kernel) has a fixed number of parameters that can be thought of as the new feature space under the Fisher kernel. In other words, the GMM/HMM models offer a mapping from a "variable-length series" of feature vectors to a "fixed-length set" of features.

As opposed to the original Fisher kernel that takes as features the amount of change in each parameter of the model, only the likelihood of the model for a new input is taken. In this sense, in the GHS approach, the final decision is performed using a 2-class SVM in a 2-D space of positive (keywords) and negative (non-keywords) scores that are computed by the corresponding HMM and GMM models.

The amount of memory requirement for the GHS approach is in order of megabytes as opposed to gigabytes, and the processing time for a document is around 2-3 seconds versus 2-3 minutes with the LMM+k-NN method. Furthermore, the GHS approach is scalable, meaning that it can be used in applications with much larger lexica and training datasets. However, the learning process of the GHS is rather slow for online keyword spotting. The implementation of the present disclosure takes around one hour to learn a GHS model for a new (i.e. unseen) keyword. Accordingly, it is to be understood that other unlearning methods for global GMM models that can be learnt offline may be used, and then adapted to new sets of keywords and non-keywords with less computations.

Figure 24:
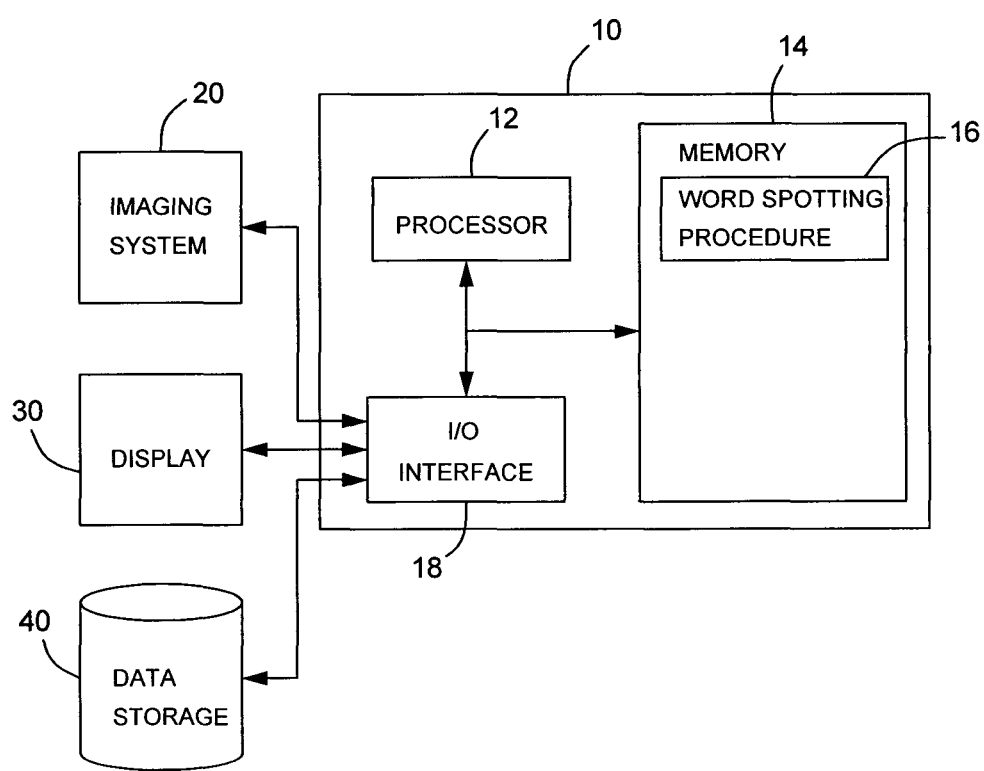
FIG. 24 is a schematic representation of a system for the spotting of words in handwritten documents in accordance with an illustrative embodiment of the present disclosure.

Referring to FIG. 24, the system for the spotting of words in handwritten documents 10 includes a processor 12 with an associated memory 14 having stored therein processor executable instructions 16 for configuring the processor 12 to perform various processes, namely the spotting of words in handwritten documents procedure 100 of FIG. 1. The word spotting system 10 further includes an input/output (I/O) interface 18 for communication with an imaging system 20, for example a scanner, and a display 30.

The word spotting system 10 obtains at digital/scanned image of the handwritten document from the imaging system 20 and executes the word spotting procedure 100 (see FIG. 1) on the document image. The spotted words are then displayed on the display 30 and may be saved to the memory 14, to other data storage devices or medium 40, or provided to a further system via the I/O interface 18. The image of the handwritten document may also be assigned to a certain category based on the presence of all or part of the detected keywords and saved accordingly to the memory 14, to other data storage devices or medium 40, or provided to a further system via the I/O interface 18.

Although the present disclosure has been described with a certain degree of particularity and by way of an illustrative embodiments and examples thereof, it is to be understood that the present disclosure is not limited to the features of the embodiments described and illustrated herein, but includes all variations and modifications within the scope and spirit of the disclosure as hereinafter claimed.

What is claimed is:

1. A method for the spotting of keywords in a handwritten document, comprising the steps of :
   inputting an image of the handwritten document;
   performing word segmentation on the image to obtain segmented words;
   performing word matching, consisting in the sub-steps of :
      performing character segmentation on the segmented words;
      performing character recognition on the segmented characters;
      performing distance computations on the recognized characters using a Generalized Hidden Markov Model with ergodic topology to identify words based on character models;
      performing non-keyword rejection on the identified words using a classifier based on a combination of Gaussian Mixture Models, Hidden Markov Models and Support Vector Machines, the non-rejected identified words being identified as spotted keywords;
   outputting the spotted keywords.

2. The method of claim 1, wherein the step of performing word segmentation on the image includes the sub-steps of:
   performing pre-processing on the image to remove non-text elements;
   performing line extraction on the preprocessed image to provide extracted text lines;
   performing word segmentation on the extracted text lines.

3. The method of claim 2, wherein the sub-step of performing pre-processing on the image includes at least one operation selected from the group consisting of margin removal, skew correction, rule-line removal and noise removal.

4. The method of claim 2, wherein the sub-step of performing line extraction on the preprocessed image includes the sub-steps of:
   applying a set of Fast Fourier Steerable filters to an adaptive local connectivity map of the pre-processed image using linear interpolation, the filters each being steered in different directions;

binarizing the filtered image to obtain a binarized line map;

post-processing the binarized line map to remove thin connected components;

vertically filling remaining connected components;

providing the extracted text lines.

5. The method of claim 2, wherein the sub-step of performing line extraction on the preprocessed image includes the sub-steps of:

applying a set of Fast Fourier Steerable filters to an adaptive local connectivity map of the preprocessed image using nearest-neighbor interpolation, the filters each being steered in different directions;

binarizing the filtered image to obtain a binarized line map;

post-processing the binarized line map to remove thin connected components;

providing the extracted text lines.

6. The method of claim 2, wherein the sub-step of performing line extraction on the pre-processed image further includes the sub-step of:

performing local skew correction inside a bounding box corresponding to each extracted text line.

7. The method of claim 2, wherein the step of performing word segmentation on the extracted text lines is performed with a scale-space algorithm using derivatives of fast anisotropic Gaussian filters implemented in the Fourier domain.

8. The method of claim 2, further comprising the steps of:

generating, prior to the step of performing word matching, word segmentation hypotheses for each of the extracted text lines using a Markov Chain;

performing a threshold selection on the word segmentation hypotheses using a segmentation threshold;

selecting the most likely word segmentation hypotheses based on the segmentation threshold.

9. The method of claim 8, wherein the segmentation threshold is set to a value that minimizes an error between probabilities corresponding to perfectly segmented lines, over-segmented lines and undersegmented lines.

10. The method of claim 8, wherein the step of performing a threshold selection on the word segmentation hypotheses further uses automatically generated over and under segmentation training data.

11. The method of claim 10, wherein the over and under segmentation training data is obtained by performing the steps of:

providing a collection of training documents containing text line and word information;

computing estimates of average intra-word and inter-word distances;

generating over-segmented text lines by merging neighboring connected components closer than given first threshold percentage of the average intra-word distance;

generating over-segmented text lines by merging neighboring connected components closer than given second threshold percentage of the average inter-word distance.

12. The method of claim 2, further comprising the steps of:

generating, prior to the step of performing word matching, word segmentation hypotheses for each of the extracted text lines using a Hidden Markov Model;

performing a threshold selection on the word segmentation hypotheses using a segmentation threshold;

selecting the most likely word segmentation hypotheses based on the segmentation threshold.

13. The method of claim 1, wherein the step of performing word matching further comprises the sub-step of:

merging, prior to the sub-step of performing character recognition, broken characters in the segmented words.

14. The method of claim 13, wherein the substep of merging broken characters comprises the sub-steps of:

creating a sequence of connected components corresponding to characters or pieces of character in the segmented words;

defining a neighborhood relation based on an Euclidean distance and overlapping of the connected components;

creating a neighboring graph of the connected components based on the neighborhood relation;

partitioning the neighboring graph using an iterative using a best score based on a width and the overlapping of connected components;

merging broken characters based on the partitioned neighboring graph.

15. The method of claim 1, wherein the sub-step of performing character recognition on the segmented characters is based on a background skeletal graph.

16. The method of claim 15, wherein the sub-step of performing character segmentation on the segmented words includes the sub-steps of:

performing pre-processing on the segmented characters;

computing a background skeleton;

computing the skeletal graph from the background skeleton;

removing curves and short branches from the skeletal graph;

connecting each branch corresponding to an end-point of a downward branch that goes below a baseline of the image to a nearest point in the skeletal graph that is below the baseline of the image;

connecting each branch corresponding to an end-point of an upward branch that goes above the baseline of the image to a nearest point in the skeletal graph that is above the baseline of the image;

removing all remaining branches of the skeletal graph;

providing the segmented characters.

17. The method of claim 16, wherein the sub-step of performing character segmentation on the segmented words further includes the sub-step of:

detecting, prior to performing pre-processing on the segmented characters, under-segmented pairs of characters using a classifier based on a fuzzy interference system using average number of transition features.

18. The method of claim 16, wherein the sub-step of performing pre-processing on the segmented characters includes at least one operation selected from the group consisting of slant correction, binarization, vertical filling inside each connected components and removing isolated blocks.

19. The method of claim 16, wherein the sub-step performing pre-processing on the segmented characters is performed using an input perturbation and classifier combination algorithm.

20. The method of claim 1, wherein the step of performing word segmentation comprises the steps of:

obtaining extracted text lines from an image of the document;

generating word segmentation hypotheses for each of the extracted text lines using one of a Markov Chain and a Hidden Markov Model;

performing a threshold selection on the word segmentation hypotheses using a segmentation threshold;
selecting the most likely word segmentation hypotheses based on the segmentation threshold;
providing the segmented words.

21. The method of claim 20, wherein the step of performing a threshold selection on the word segmentation hypotheses further uses automatically generated over and under segmentation training data, wherein the over and under segmentation training data is obtained by performing the steps of:
providing a collection of training documents containing text line and word information;
computing estimates of average intra-word and inter-word distances;
generating over-segmented text lines by merging neighboring connected components closer than given first threshold percentage of the average intra word distance;
generating over-segmented text lines by merging neighboring connected components closer than given second threshold percentage of the average inter-word distance.

* * * * *